United States Patent
Hurwitz

(10) Patent No.: US 11,102,016 B2
(45) Date of Patent: Aug. 24, 2021

(54) TRANSISTOR BASED PUF APPARATUS

(71) Applicant: Analog Devices International Unlimited Company, Limerick (IE)

(72) Inventor: Jonathan Ephraim David Hurwitz, Edinburgh (GB)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/984,066

(22) Filed: Aug. 3, 2020

(65) Prior Publication Data

US 2021/0021435 A1     Jan. 21, 2021

Related U.S. Application Data

(63) Continuation of application No. 16/296,998, filed on Mar. 8, 2019, now Pat. No. 10,764,069.

(51) Int. Cl.
*H04L 9/32*     (2006.01)
*H04L 9/08*     (2006.01)

(52) U.S. Cl.
CPC .......... *H04L 9/3278* (2013.01); *H04L 9/0866* (2013.01)

(58) Field of Classification Search
None
See application file for complete search history.

(56) References Cited

U.S. PATENT DOCUMENTS

| | | | |
|---|---|---|---|
| 8,525,549 B1 | 9/2013 | Feng et al. | |
| 8,619,979 B2 | 12/2013 | Ficke et al. | |
| 9,018,972 B1 | 4/2015 | Gurrieri et al. | |
| 10,560,095 B2 | 2/2020 | O'Dwyer et al. | |
| 10,764,069 B1 | 9/2020 | Hurwitz | |
| 2012/0020145 A1 | 1/2012 | Huber et al. | |

(Continued)

FOREIGN PATENT DOCUMENTS

| JP | 2017092885 A | 5/2017 |
|---|---|---|
| KR | 101408619 B1 | 6/2014 |

OTHER PUBLICATIONS

U.S. Appl. No. 16/716,435, filed Dec. 16, 2019, Hurwitz.

(Continued)

*Primary Examiner* — Crystal L Hammond
(74) *Attorney, Agent, or Firm* — Wolf, Greenfield & Sacks, P.C.

(57) ABSTRACT

The present disclosure relates to a PUF apparatus and method for generating a persistent, random number. The generated number is random in that each particular instance of PUF apparatus should generate a randomly different number to all other instances of PUF apparatus, and is persistent in that each particular instance of the PUF apparatus should repeatedly generate the same number, within acceptable error correction tolerances. The persistent, random number is determined by selecting one or more PUF cells, each comprising a matched pair of transistors that are of identical design, and comparing an on-state characteristic of the pair (e.g., turn-on threshold voltage or gate-source voltage). The difference in on-state characteristic of each selected pair of transistors is caused by random manufacturing differences between the transistors. This causes the randomness between each different instance of PUF apparatus, and should be relatively stable over time to provide persistence of the generated number.

20 Claims, 18 Drawing Sheets

(56) References Cited

U.S. PATENT DOCUMENTS

| | | |
|---|---|---|
| 2013/0322617 A1 | 12/2013 | Orshansky |
| 2014/0279532 A1 | 9/2014 | Tremlet |
| 2015/0058928 A1* | 2/2015 | Guo .................. H04L 63/0876 726/3 |
| 2017/0345116 A1* | 11/2017 | Katoh .................... G06F 21/64 |
| 2017/0346644 A1* | 11/2017 | Cambou .............. H04L 9/3278 |
| 2018/0013431 A1 | 1/2018 | Bury et al. |
| 2018/0019881 A1 | 1/2018 | Pfeiffer et al. |
| 2018/0091300 A1 | 3/2018 | Tomishima |
| 2020/0287729 A1 | 9/2020 | Hurwitz |

OTHER PUBLICATIONS

U.S. Appl. No. 16/986,220, filed Aug. 5, 2020, Spalding, Jr. et al.
U.S. Appl. No. 16/986,210, filed Aug. 5, 2020, Holland et al.
Kalyanaraman et al., Highly Secure Strong PUF based on Nonlinearity of MOSFET Subthreshold Operation. Thesis. Department of Electrical and Computer Engineering. The University of Texas at Austin. 2012; 13 pages.
Tang et al., A Physical Unclonable Function based on Capacitor Mismatch in a Charge-Redistribution SAR-ADC. 2018 IEEE International Symposium on Circuits and Systems. ISCAS 2018—Proceedings. May 2018; 5 pages.

* cited by examiner

TRANSISTOR BASED PUF APPARATUS

CROSS-REFERENCE TO RELATED APPLICATIONS

This application is a continuation claiming the benefit under 35 U.S.C. § 120 of U.S. application Ser. No. 16/296,998, filed Mar. 8, 2019, and entitled "TRANSISTOR BASED PUF APPARATUS", which is hereby incorporated by reference herein in its entirety.

TECHNICAL FIELD

The present disclosure relates to transistor based, physical unclonable function (PUF).

BACKGROUND

A physical unclonable function or 'PUF' is a physical entity capable of generating an output ('response') to a given input ('challenge') that is unique to that particular PUF such that it can be regarded as a 'fingerprint'. This capacity is typically arrived at by devising the PUF in such a way that its output depends upon features that differ randomly in each device due to minor manufacturing variations. Thus, a PUF cannot be readily replicated with the correct fingerprint, even with full knowledge of its circuit layout. The response may be used for various different purposes, for example in cryptographic operations to secure communications to/from a device that includes the PUF, or used in a process of authenticating the identity of a device that includes the PUF, etc.

SUMMARY

The present disclosure relates to a PUF apparatus for generating a persistent, random number. The number is random in that each particular instance of the PUF apparatus should generate a randomly different number to all other instances of the PUF apparatus, and is persistent in that each particular instance of the PUF apparatus should repeatedly generate the same number, within acceptable error correction tolerances. The random number is determined by selecting one or more PUF cells, each of which comprise a matched pair of transistors that are of identical design, and then comparing an on-state characteristic of the pair, such as turn-on threshold voltage or gate-source voltage. The difference in on-state characteristic of each selected pair of transistors is caused by random manufacturing differences between the transistors, which creates the randomness between each different instance of PUF apparatus, and which should be relatively stable over time which contributes to the persistence of the generated number.

A PUF apparatus may comprise one or more PUF cells, each comprising some physical features that differ randomly in each device due to minor manufacturing variations, and some determination circuitry configured to readout a PUF value from each of the PUF cells. The PUF apparatus may be configured such that the determination circuitry can read out a random PUF value from each of the PUF cells and generate a persistent random number based on the PUF value(s). The persistent random number may then be used as part of the determination of a 'response' to a 'challenge'. For example, the PUF apparatus may receive a 'challenge' from another circuit, the determination circuitry may then read the persistent random number from the PUF cells and the PUF apparatus may then determine a 'response' based on the 'challenge' and the persistent random number (for example, but carrying out some cryptographic operation, such as a hash, or XOR, or encryption using the 'challenge' and the persistent random number). A persistent random number is random in that its value is dependent on the minor, random manufacturing variations between different PUF apparatus. Thus, different instances of the PUF apparatus, whilst identical in design, should each generate a different, persistent random number. A random number is 'persistent' in that it should stay the same, or stay the same within acceptable limits, over time. For example, the persistent random number generated by the one or more PUF cells of a PUF apparatus should be the same each time it is generated (or stay the same within acceptable limits, for example so that it can be corrected using error correcting code, ECC), so that it can act as a reliable fingerprint of the device.

In a first aspect of the present disclosure, there is provided a Physically Unclonable Function, PUF, apparatus comprising: a plurality of PUF cells, each PUF cell comprising: a plurality of transistors, wherein the plurality of transistors comprises: a matched pair of transistors for transistor on-state characteristic comparison, and a selection mechanism for selecting the PUF cell, and wherein the plurality of transistors in each PUF cell are all of the same transistor type; and a determination unit configured to: select at least one of the plurality of PUF cells using the selection mechanism in each of the at least one of the plurality of PUF cells; for each selected PUF cell, determine a transistor difference value based at least in part on a comparison of an on-state characteristic of the matched pair of transistors in the selected PUF cell, wherein the transistor difference value is indicative of a random manufacturing difference between the matched pair of transistors in the selected PUF cell; and determine a PUF output based at least in part on the at least one determined transistor difference value.

The selection mechanism may comprise gate terminals of the pair of transistors, and wherein the determination unit is configured to select a PUF cell by applying a selection potential to one or more of the gate terminals of the matched pair of transistors in the PUF cell.

The selection mechanism may comprise one or more selection transistors coupled to the matched pair of transistors, and wherein the determination unit is configured to select a PUF cell by applying a selection potential to the one or more selection transistors to control an operation of the one or more selection transistors.

The comparison of the on-state characteristic of the matched pair of transistors may comprise a comparison of a gate-source voltage of the matched pair of transistors.

The determination unit may be configured to determine the transistor difference value for a selected PUF cell by: (a) applying a first input signal to a first transistor of the matched pair of transistors; applying a second input signal to a second transistor of the matched pair of transistors; and determining a first transistor comparison value by comparing the on-state characteristic of the first transistor when the first input signal is applied against the on-state characteristic of the second transistor when the second input signal is applied; then (b) applying the second input signal to the first transistor of the matched pair of transistors; applying the first input signal to the second transistor of the matched pair of transistors; and determining a second transistor comparison value by comparing the on-state characteristic of the first transistor when the second input signal is applied against the on-state characteristic of the second transistor when the first input signal is applied; and then (c) determining the transistor difference value based on the first transistor comparison value and the second transistor comparison value (for example, based on a sum, or an average or a difference of the first and second transistor comparison values).

The determination unit (170) may be configured to: in (a), simultaneously apply the first input signal to the first transistor and the second input signal to the second transistor; and in (b), simultaneously apply the second input signal to the first transistor and the first input signal to the second transistor.

The determination unit (170) may further comprise: at least one first current source ($232x$) configured to output a first current signal; and a second current source ($234x$) configured to output a second current signal; wherein the first input signal comprises the first current signal and the second input signal comprises the second current signal.

The first input signal may comprise a first voltage signal and the second input signal comprises a second voltage signal.

The at least one of the first voltage signal and the second voltage signal may vary with time.

The determination unit may be configured to: during determination of the first transistor comparison value for a selected PUF cell, apply the first voltage signal to a gate terminal of the first transistor and apply the second voltage signal to a gate terminal of the second transistor; and during determination of the second transistor comparison value for a selected PUF cell, apply the second voltage signal to the gate terminal of the first transistor and apply the first voltage signal to the gate terminal of the first transistor so as also to select the PUF cell.

The selection mechanism may comprise the gate terminals of the matched pair of transistors, and wherein the first voltage signal and the second voltage signal also act as selection potentials for selecting the PUF cell.

The matched pair of transistors may be configured as a differential pair, and wherein the matched pair of transistors form an input of a comparator.

The transistor difference value may comprise a digital value indicative of the random manufacturing difference between the matched pair of transistors, and wherein the determination unit comprises an Analog-to-Digital converter for use in determining the transistor difference value, and wherein the Analog-to-Digital converter comprises the comparator.

Each matched pair of transistors may comprise a first transistor and a second transistor, and wherein the first transistor comprises a first sub-transistor and a second sub-transistor, and wherein the second transistor comprises a third sub-transistor and a fourth sub-transistor, and wherein the first sub-transistor, second sub-transistor, third sub-transistor and fourth sub-transistor are arranged in a semiconductor layout such that a centre of mass of the first transistor is substantially the same as a centre of mass of the second transistor.

The first sub-transistor, the second sub-transistor, the third sub-transistor and the fourth sub-transistor may be arranged in a semiconductor layout such that: when the first transistor is conducting current, a channel current in the first sub-transistor flows in a first direction in the semiconductor and a channel current in the second sub-transistor flows in a second direction in the semiconductor, and when the second transistor is conducting current, a channel current in one of the third sub-transistor and the fourth sub-transistor flows in the first direction and a channel current in the other of the third sub-transistor and the fourth sub-transistor flows in the second direction, and wherein the first direction and the second direction are substantially opposite spatial directions in the semiconductor layout.

A semiconductor layout of the matched pair of transistors may be arranged such that the first sub-transistor and third sub-transistor share a drain terminal and the second sub-transistor and the fourth sub-transistor share a further drain terminal.

In a second aspect of the disclosure, there is provided a method for determining a Physically Unclonable Function, PUF, output using a plurality of PUF cells each comprising a plurality of transistors of the same transistor type, the plurality of transistors comprises a matched pair of transistors and a selection mechanism for selecting the PUF cell, the method comprising: selecting one or more PUF cells using the selection mechanism in each of the at least one of the plurality of PUF cells ($105_{x,y}$); for each selected PUF cell, determining a transistor difference value based at least in part on a comparison of an on-state characteristic of the matched pair of transistors in the selected PUF cell, wherein the transistor difference value is indicative of a random manufacturing difference between the matched pair of transistors in the selected PUF cell; and determining the PUF output based at least in part on the at least one determined transistor difference value.

Determining the transistor value for a selected PUF cell may comprise: applying a first input signal and a second input signal to a first transistor of the matched pair of transistors and a second transistor of the matched pair of transistors respectively; determining a first transistor comparison value by comparing the on-state characteristic of the matched pair of transistors; applying the first input signal and the second input signal to the second transistor and the first transistor respectively; determining a second transistor comparison value by comparing the on-state characteristic of the matched pair of transistors; and determining the transistor difference value based on a difference between the first transistor comparison value and the second transistor comparison value.

The first input signal may comprise a first current and/or a first voltage signal, and the second input signal may comprise a second current and/or a second voltage signal.

Selecting a PUF cell may comprise applying a selection potential to one or more of the gate terminals of the matched pair of transistors in the PUF cell.

In a third aspect of the disclosure, there is provided an apparatus (for example, a PUF apparatus) comprising: a pair of transistors comprising: a first transistor; and a second transistor coupled to the first transistor to form the pair of transistors, wherein the first transistor comprises a first sub-transistor and a second sub-transistor, and wherein the second transistor of the pair of transistors comprises a third sub-transistor and a fourth sub-transistor.

The first sub-transistor, second sub-transistor, third sub-transistor and fourth sub-transistor may be arranged in a semiconductor layout such that a centre of mass of the first transistor is substantially the same as a centre of mass of the second transistor.

A semiconductor layout of the pair of transistors may be arranged such that the first sub-transistor and third sub-transistor share a drain terminal and the second sub-transistor and the fourth sub-transistor share a further drain terminal.

The first sub-transistor, the second sub-transistor, the third sub-transistor and the fourth sub-transistor may be arranged in a semiconductor layout such that: when the first transistor is conducting current, a channel current in the first sub-transistor flows in a first direction in the semiconductor and a channel current in the second sub-transistor flows in a second direction in the semiconductor, and when the second transistor is conducting current, a channel current in one of the third sub-transistor and the fourth sub-transistor flows in the first direction and a channel current in the other of the third sub-transistor and the fourth sub-transistor flows in the second direction, and wherein the first direction and the second direction are substantially opposite spatial directions in the semiconductor layout.

The apparatus may further comprise: a further pair of transistors having the same semiconductor design as that of the pair of transistors, wherein the pair of transistors and the further pair of transistors are arranged in the semiconductor layout such that the second sub-transistor of the pair of transistors and a first sub-transistor of the further pair of transistors share a source terminal.

The drain terminal of the first transistor of the pair of transistors and a drain terminal of a first transistor of the further pair of transistors may be coupled to a first common signal output line, and wherein the drain terminal of the second transistor of the pair of transistors and a drain terminal of the first transistor of the further pair of transistors may be coupled to a second common signal output line.

The apparatus may further comprise an even further pair of transistors, wherein the apparatus comprises: a first gate structure forming a gate for the first transistor of the pair of transistors and a first transistor of the even further pair of transistors, such that a gate potential for the first transistor of the pair of transistors is substantially the same as a gate potential for the first transistor of the even further pair of transistors; and a second gate structure forming a gate for the second transistor of the pair of transistors and a second transistor of the even further pair of transistors, such that a gate potential of the second transistor of the pair of transistors is substantially the same as a gate potential of the second transistor of the even further pair of transistors.

The first transistor and the second transistor may be MOS devices (for example, PMOS devices).

The apparatus may further comprise a plurality of pairs of transistors arranged in a two-dimensional array.

DRAWINGS

Aspects of the present disclosure are described, by way of example only, with reference to the following drawings, in which.

DETAILED DESCRIPTION

Figure 1:
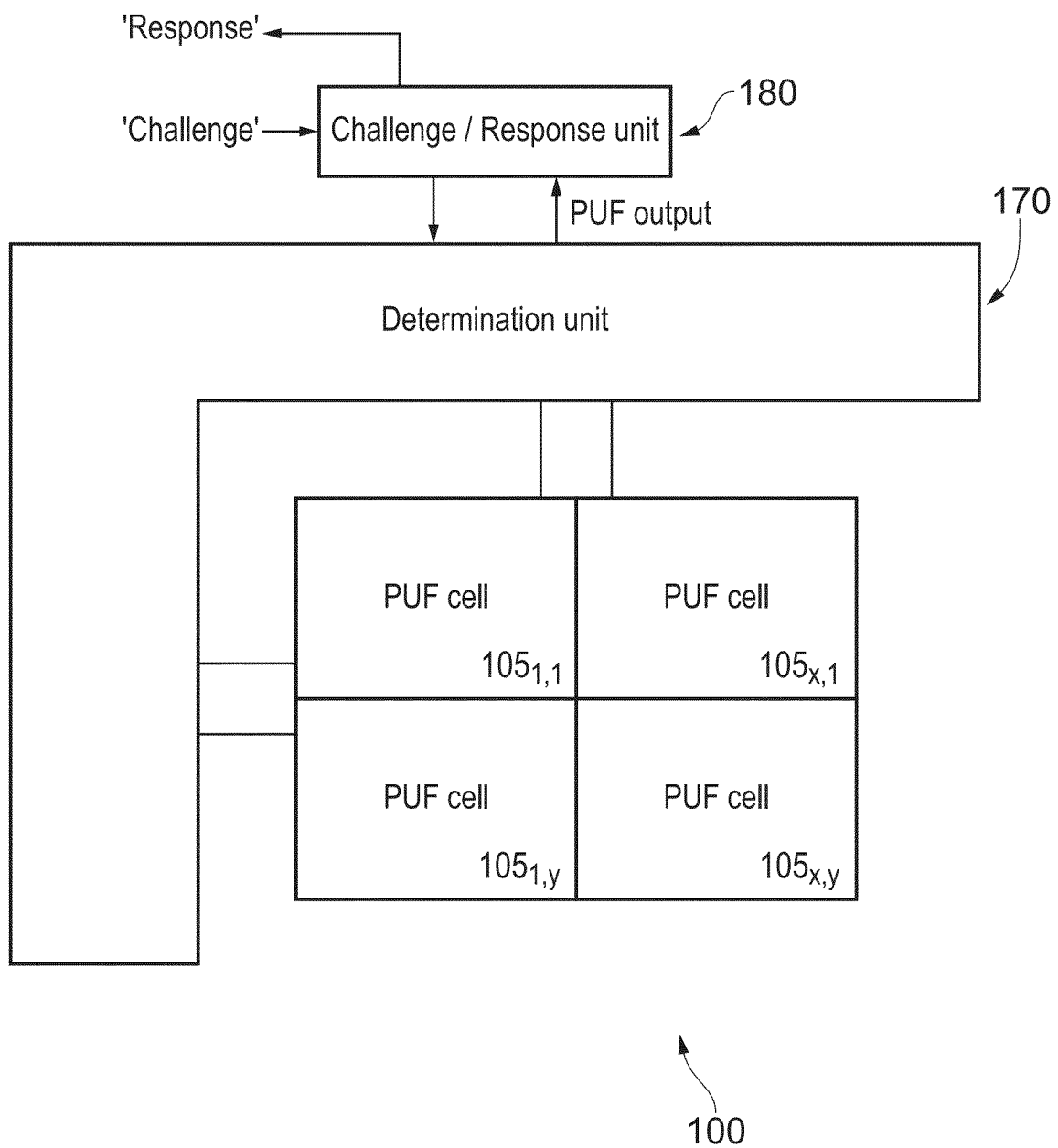
FIG. 1 shows an example schematic representation of PUF apparatus in accordance with an aspect of the present disclosure.

The inventors have identified many different challenges in implementing a PUF apparatus with one or more PUF cells. First, each possible output of a PUF cell should have an equal, or substantially equal, probability. For example, if a PUF cell is configured to output a '1' or a '0' depending on random manufacturing variations the PUF cell, there should be an equal, or substantially equal, probability of a '1' or a '0'. If this is not achieved, the output of the PUF cell may not be sufficiently random. Achieving this requires a circuit design and layout configuration of each PUF cell, and the PUF apparatus overall, that will not favour any one particular possible output value.

Second, it is preferable for the PUF apparatus to be low cost, in terms of power consumption and/or area used in an integrated circuit (IC) and/or time required to generate the PUF output, so that it can be implemented in devices more easily. For example, PUF apparatus may be particularly useful for Internet of Things (IoT) device security, such as for authenticating the identity of an IoT device and/or securing communications to/from an IoT device. In order to include a PUF apparatus in an IoT device, it is helpful for the PUF apparatus to be cheap and/or low power and/or small.

To address at least some of these challenges, a PUF apparatus is disclosed herein, which comprises a plurality of PUF cells $105_{x,y}$. Each of the PUF cells includes a plurality of transistors $210_{x,y}$ that are all of the same transistor type, and include a selection mechanism and a matched pair of transistors $210_{x,y}$. The matched pair of transistors are identical in design, but will inherently have some random manufacturing differences, which should result in differences in their on-state characteristics. One or more particular PUF cells can be selected for measurement using their selection mechanism and a difference between an on-state characteristic, such as gate-source voltage, for the matched pair of transistors in the selected cell(s) determined. Based on the comparison of the on-state characteristic of one or more PUF cells, a persistent random number can be generated as the PUF output.

By making the plurality of transistors in each cell of the same type (for example, all p-type, or all n-type), it is possible to make each PUF cell to a very small dimension, which can this increase the density of the PUF cells and thereby reduce the overall size of the PUF apparatus. In addition to this, the reduction of size may improve the randomness in the transistor on-state characteristic of each cell, by mitigating any bias towards one transistor or the other caused by gradients, such as doping gradients or oxide gradients, across the cell. Furthermore, by comparing the on-state characteristics of the matched pair of transistors (as opposed to failure characteristics, for example), reliability may be improved since high voltages are not applied and gate oxides are not degraded, and the pair of transistors may be used for additional purposes, such as acting as the selection mechanism, thereby even further reducing the size of each cell.

FIG. 1 shows an example schematic representation of PUF apparatus 100 in accordance with an aspect of the present disclosure. The PUF apparatus comprises a plurality of PUF cells $105_{x,y}$, a determination unit 170 and a challenge/response unit 180. Whilst only a 2×2 array of PUF cells $105_{x,y}$ is represented, it will be appreciated that there may be any number of PUF cells, (for example, 8, 12, 20, 32, 128, 256, etc, etc) arranged in an array of any size and dimension, or arranged in any other suitable configuration.

The determination unit 170 is configured to determine a PUF output using the plurality of PUF cells $105_{x,y}$. The PUF output is a persistent random number, which is explained in more detail in the 'background' section of this disclosure.

The challenge/response unit 180 is configured to receive a 'challenge' from an external entity, request and obtain the PUF output from the determination unit 170 and then determine and return a response based on the challenge and the PUF output. The challenge/response unit 180 may be configured to operate in any suitable way that will be apparent to the person skilled in the art of PUF devices. The challenge/response unit 180 may form a separate unit, or may be part of the determination unit 170. The present disclosure is concerned specifically with the configuration and operation of the PUF cells $105_{x,y}$ and determination unit 170, as described in detail below. Therefore, no further reference to, or explanation of, the challenge/response unit 180 is given in this disclosure.

Figure 2:
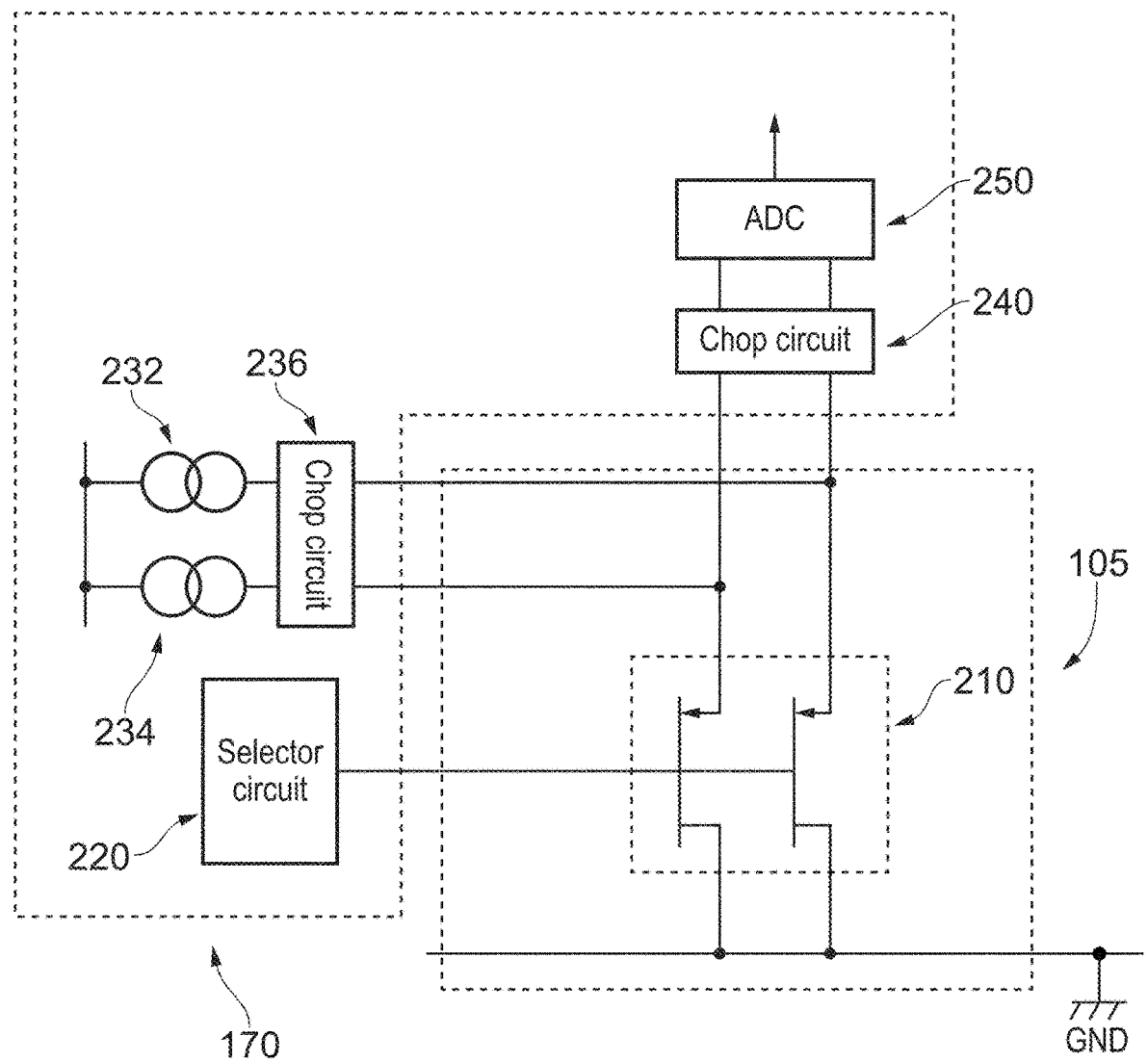
FIG. 2 shows an example schematic representation of an implementation of a PUF cell and determination unit of the PUF apparatus of FIG. 1.

FIG. 2 shows a schematic diagram of an example implementation of a PUF cell 105 and the determination unit 170 configured to determine a PUF value of the PUF cell 105.

Figure 3:
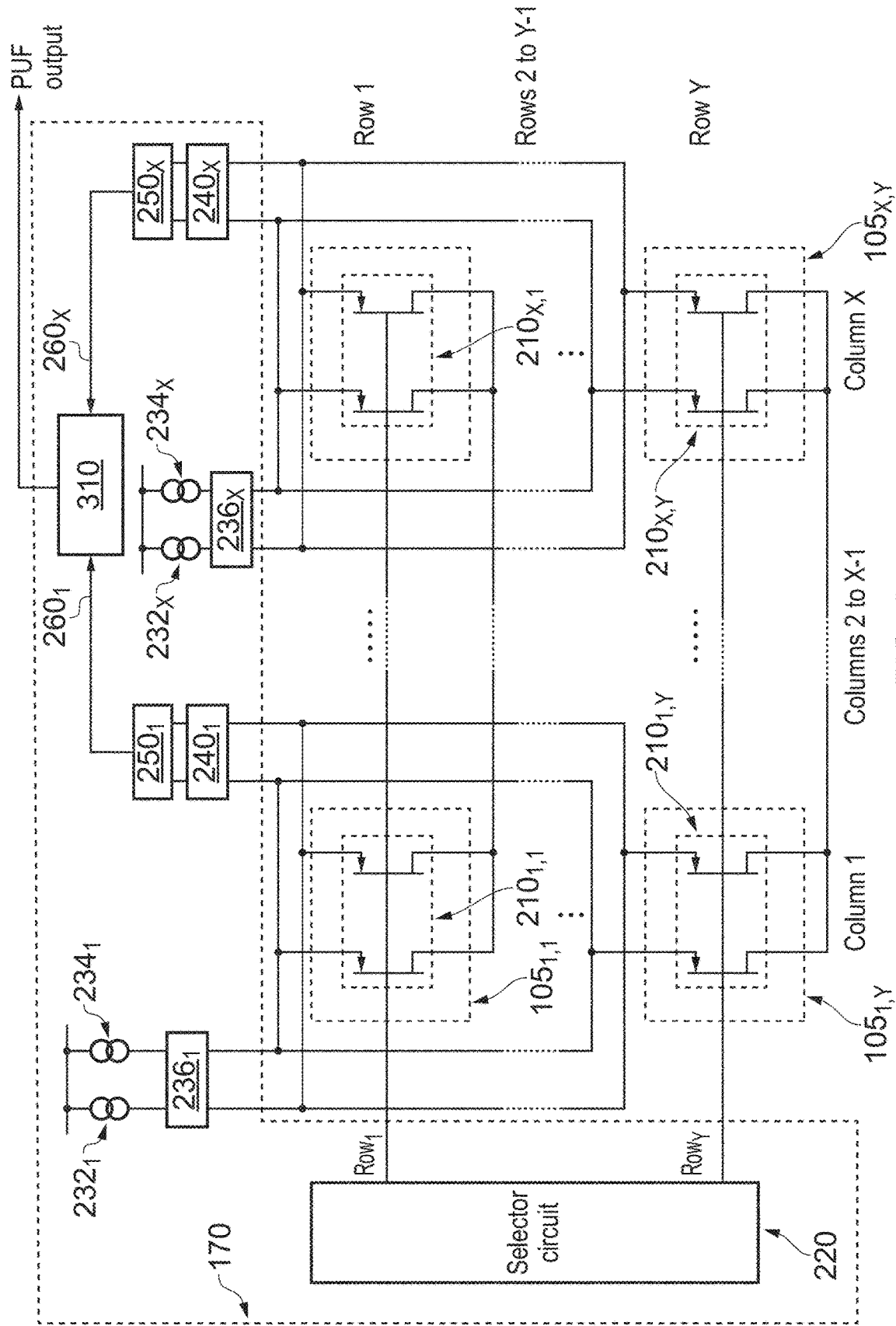
FIG. 3 shows an example schematic representation of an array of the PUF cells of FIG. 2.

FIG. 3 shows a schematic diagram of an array of PUF cells $105_{x,y}$ that are each configured in the same way as the PUF cell 105 represented in FIG. 2.

Returning to FIG. 2, the PUF cell 105 comprises a matched pair of transistors 210. The term 'matched' in this disclosure means that the pair of transistors are of identical design. Whilst FIG. 2 shows a representation of a matched pair of p-type FETs, it will be appreciated that throughout the present disclosure, in every different described aspect, the matched pair of transistors 210 may be of any transistor type, for example p-type, n-type, enhancement, depletion, FETs (such as MOSFETs, JFETs, MESFETs, etc), BJTs (such as IGBTs, heterojunction bipolar transistors, etc), etc. For the sake of simplicity, this disclosure focuses specifically on FETs, but it should be appreciated that the terms 'gate', 'source' and 'drain' used herein encompass the terms 'base', 'emitter' and 'collector' of BJTs.

Whilst the two transistors making up the matched pair of transistors 210 are of identical design, in practice there will inevitably be small, random manufacturing variations between the two transistors. Those manufacturing variations may include at least one of: differences in gate oxide thickness, differences in doping densities, differences in carrier mobility, differences in device dimensions, etc. These manufacturing variations result in variations in transistor on-state characteristics/performance, such as differences in turn-on threshold voltage, differences in $\beta$, differences in the back-gate effect, etc. The term 'on-state' is used throughout this disclosure to refer to an operational characteristic of a transistor relating to its normal on state operation, such as turn-on threshold voltage, gate-source voltage, drain current, linear resistivity, saturation point, transconductance, etc. By considering an on-state characteristic, as opposed to an off-state characteristic (such as off-state leakage current) or a failure characteristic (such as dielectric breakdown), reliability of the PUF apparatus 100 may be increased, since high voltages are not applied, gate oxides are not degraded, etc. Furthermore, the matched pair of transistors 210 may be used for other purposes in addition to the characteristic comparison, such as forming part of a selection mechanism (as explained later).

The determination unit 170 is configured to determine a transistor difference value based at least in part on a comparison of an on-state characteristic of the matched pair of transistors 210, wherein the transistor difference value is indicative of one or more random manufacturing differences between the matched pair of transistors 210. In this implementation, the compared on-state characteristic of the matched pair of transistors 210 is the gate-source voltage of the two transistors ($V_{GS}$). The $V_{GS}$ of the two transistors may differ as a result of one or many different random manufacturing differences that cause, for example, a difference in the turn-on threshold voltage and/or $\beta$ and/or back-gate effect, of the transistors.

The drains of the matched pair of transistors 210 are coupled to ground. The determination unit 170 comprises a selector circuit 220 configured to apply a suitable voltage to the gates of the matched pair of transistors 210 in order to turn-on the transistors. This voltage functions as a 'selection potential', which is explained in more detail below with reference to FIG. 3. The determination unit 170 also comprises a first current source 232 and a second current source 234, that are configured to provide the same amount of current as each other. The current from the first current source 232 may be applied as a first input signal to the source of a first transistor of the matched pair of transistors 210, and the current from the second current source 234 may be applied as a second input signal to the source of a second transistor of the matched pair of transistors 210. If the matched pair of transistors 210 were truly identical, their source voltages would be exactly the same. However, owing to random manufacturing differences, the gate-source voltages of the two transistors are likely to be different and, since the gate voltage applied to the matched pair of transistors 210 is the same, the source voltages of the matched pair of transistors 210 should be different by some amount.

The determination unit 170 further comprises an ADC 250 that is configured to measure the difference in the gate-source voltage and output a digital value indicative of the difference. However, it has been realised that there may be some mismatch between the currents provided by the first current source 232 and the second current source 234. Therefore, a chop circuit 236 may be provided so that the first input signal (the current from the first current source 232) may be applied to the first transistor, the second input signal (the current from the second current source 234) may be applied to the second transistor and a first transistor comparison value determined by the ADC 250 by comparing the gate-source voltages of the matched pair of transistors 210. Then, the chop circuit 236 may switch the coupling of the first current source 232 and the second current source 234 such that the first input signal is applied to the second transistor, the second input signal is applied to the first transistor and a second transistor comparison value is determined by the ADC 250 by comparing the gate-source voltages of the matched pair of transistors 210.

The first and second transistor comparison values may be expressed as:

First transistor mismatch value=$\Delta V_{GS}$+mismatch+ noise1

Second transistor mismatch value=$\Delta V_{GS}$−mismatch+ noise 2

The transistor difference value for the PUF cell 105 may then be determined based on the first transistor comparison value and the second transistor comparison value, for example from a sum or an average of the first transistor comparison value and the second transistor comparison value.

For example, the transistor difference value may be expressed as:

$$\text{transistor difference value} = \text{first mismatch value} + \text{second mismatch value}$$
$$= 2^*\Delta V_{GS} + noise1 + noise2$$

Or $$\text{transistor difference value} = avg \text{ of first mismatch value and second mismatch value}$$
$$= \Delta V_{GS} + (noise1 + noise2)/2$$

In this way, any measurement inaccuracies caused by a mismatch between the first and second current sources 232 and 234 may be significantly reduced or eliminated to the first order. Furthermore, the signal to noise ratio may also be improved, in general by about √2, since noise1 and noise1 are largely uncorrelated. It will be appreciated that the chop circuit 236 is optional and the determination unit 170 may be configured to determine the transistor difference value from a single comparison of the gate-source voltages, for example if the first and second current sources are considered to be matched to a sufficiently high accuracy.

Furthermore, optionally, a further chop circuit 240 may be provided at the input to the ADC 250. This may operate similarly to the chop circuit 236, and at the same time as the chop circuit 236, in order to switch the coupling of differential inputs to a comparator in the ADC 250. In this case however, the sign of the $\Delta V_{GS}$ component in the first transistor comparison value will be different from the sign of the $\Delta V_{GS}$ component in the second transistor comparison value as a result of switching the inputs to the comparator in the ADC 250. For example, in the case where both chop circuit 236 and 240 are used:

First transistor mismatch value=$\Delta V_{GS}$+mismatch+ offset+noise1

Second transistor mismatch value=−$\Delta V_{GS}$+mismatch+offset+noise 2 where offset is the offset of the ADC 250.

In this case, the transistor difference value may be determined by taking the difference of the first transistor comparison value and the second transistor comparison value. For example:

$$\text{transistor difference value} = \text{first mismatch value} -$$
$$\text{second mismatch value}$$
$$= 2^*\Delta V_{GS} + noise1 - noise2$$

Using the chop circuit 236 in this way may help to cancel any offset in the ADC 250 and well as any mismatch between the first and second current sources 232 and 234. Furthermore, the $\Delta V_{GS}$ component has increased by 2× and low frequency components of noise1 and noise2 should mostly cancel each other out. However, it will be appreciated that the chop circuit 240 is optional, depending on the configuration of the ADC 250 and the quality of components making up the ADC 250. Furthermore, the determination unit 170 may not comprise an ADC 250, but may instead determine the transistor difference value using any other suitable circuitry, for example analog only circuitry.

The chop circuit 236 and further chop circuit 240 may be configured in any suitable way to perform the switching/chopping functionality described above. For example, they may each comprise one or more switches that can be controlled (for example, by a control unit not represented in FIG. 2) to switch/chop the couplings as described above.

The transistor difference value is indicative of which of the transistors in the matched pair of transistors 210 has the larger/smaller $V_{GS}$. For example, it may simply be a "1" if the $V_{GS}$ of the first transistor is larger than the $V_{GS}$ of the second transistor, and a "0" if the $V_{GS}$ of the first transistor is smaller than the $V_{GS}$ of the second transistor. Alternatively, it may also be indicative of the magnitude of the difference. For example, it may be a positive number of a magnitude indicative of the amount by which the $V_{GS}$ of the first transistor is larger than the $V_{GS}$ of the second transistor, and may be a negative number of a magnitude indicative of the amount by which the $V_{GS}$ of the first transistor is smaller than the $V_{GS}$ of the second transistor.

Turning to FIG. 3, a plurality of PUF cells $105_{x,y}$ are represented, where x=1, 2, ... X-1, X and y=1, 2, ... Y-1, Y, such that the overall number of PUF cells $105_{x,y}$ totals X*Y. The PUF cells $105_{x,y}$ in this example are arranged in an array comprising X columns and Y rows. The selector circuit 220 has Y outputs, one for each row of the array and it can be seen that each output is coupled to the gates of all of the matched transistor pairs $210_{x,y}$ in a particular row (for example, the first output is coupled to transistor pairs $210_{x,1}$, the second output is coupled to transistor pairs $210_{x,2}$, etc). In order to select a particular row of PUF cells 105x,y, the selector circuit 210 applies a selection potential to that row (for example, a potential that exceeds the turn-on threshold voltage of the transistors) in order to turn on the matched transistor pairs $210_{x,y}$ in that row. A non-selection potential is applied to all other rows (for example, a potential that is less than the turn-on threshold voltage of the transistors). Thus, it can be seen that in this example, each matched transistor pair $210_{x,y}$ is not only used for determining a transistor difference value, it is also used as a selection mechanism for its PUF cell $105_{x,y}$. By using each matched pair of transistors $210_{x,y}$ for both of these purposes, the size of the PUF cell array may be reduced compared with an array that includes a pair of transistors to be used for the determination of a PUF value, and one or more further transistors to be used to select a PUF cell.

It can also be seen that the determination unit 170 comprises X first and second current sources $232_x$ and $234_x$, X chop circuits $236_x$, X further chop circuits $240_x$ and X ADCs $250_x$. Consequently, it is possible to determine, in parallel, transistor difference values for the X pairs of transistors $210_{x,y}$ in a selected row, thereby increasing the speed of operation. Furthermore, each set of first and second current sources $232_x$ and $234_x$, chop circuit $236_x$, further chop circuit $240_x$ and ADC $250_x$ may be shared by a column of the PUF array, thereby reducing the number of components required and thus the overall size, cost and power consumption of the PUF apparatus 100.

The determination unit 170 represented in FIG. 3 also comprises a PUF output unit 310 that either: a) receives the determined transistor difference value from each ADC $250_x$, or b) receives the determined first and second transistor comparison values from each $ADC_x$ and then determines the transistor difference value based on the first and second transistor comparison values (for example, by averaging them).

The determination unit 170 may operate by selecting one row of PUF cells $105_{x,y}$ and determining a transistor difference value for each selected PUF cell. Subsequently, the next row of PUF cells $105_{x,y}$ may be selected and transistor difference values determined for them. The operation of the selector circuit 220, chop circuits $236x$ and further chop circuits $240x$ may be controlled in any suitable way, for example by the PUF output unit 310 or any other suitable controller. Control interconnections are not represented in FIG. 3 for the sake of simplicity.

The PUF output determined by the PUF output unit 310 is a persistent random number that may be, for example, a multi-bit number. For example, if the PUF apparatus 100 is configured such that each PUF cell $105x,y$ is used to determine the value of one bit of the multi-bit PUF output, if there are 128 PUF cells $105x,y$ the output unit 310 may generate a 128-bit PUF output, where the transistor difference value for each PUF cell $105_{x,y}$ determines the value of each bit (i.e., either "0" or "1"). For example, if the transistor difference value determined for a particular PUF cell $105_{x,y}$ is indicative of the $V_{GS}$ of the first transistor being greater than the $V_{GS}$ of the second transistor, the corresponding bit in the PUF output may be set to 1. If it is indicative of the $V_{GS}$ of the first transistor being less than the $V_{GS}$ of the second transistor, the corresponding bit in the PUF output may be set to 0. Since the outcome of each transistor comparison is dependent on random manufacturing differences between the matched pair of transistors $210_{x,y}$, it can be seen that the PUF output should be random, in that each different instance of PUF apparatus 100 is highly likely to generate a randomly different PUF output. Furthermore, the outcome of each transistor comparison should generally stay the same over time (i.e., if $V_{GS}$ of the first transistor is determined to be less than $V_{GS}$ of the second transistor, this should not change over time) or stay the same to within acceptable limits (for example, a change for a small number of matched transistor pairs $105_{x,y}$ may be acceptable, since it may be possible for ECC to correct for those changes), such that the PUF output is persistent.

In some implementations, the number of PUF cells $105_{x,y}$ may exceed the number of bits in the PUF output. In this case, during enrollment of the PUF apparatus 100, the transistor comparison described above may be carried out for all of the PUF cells $105_{x,y}$. The PUF cells $105_{x,y}$ that are found to have the largest difference in $V_{GS}$ in their matched pair of transistors $210_{x,y}$ may then be registered for use in determining the PUF output in the future. The remaining PUF cells $105_{x,y}$ may effectively be ignored from then on. By using only the PUF cells $105_{x,y}$ with the largest difference in $V_{GS}$, the persistence of the PUF output may be improved, since changes over time in the magnitude of a difference in the transistor on-state characteristic (for example, caused by component drift, measurement noise, etc) are less likely to cause a change in which of the two transistors has the largest $V_{GS}$.

Whilst the above focusses specifically on the comparison of $V_{GS}$, it will be appreciated that other transistor on-state characteristics may be compared in accordance with the present disclosure.

Figure 15:
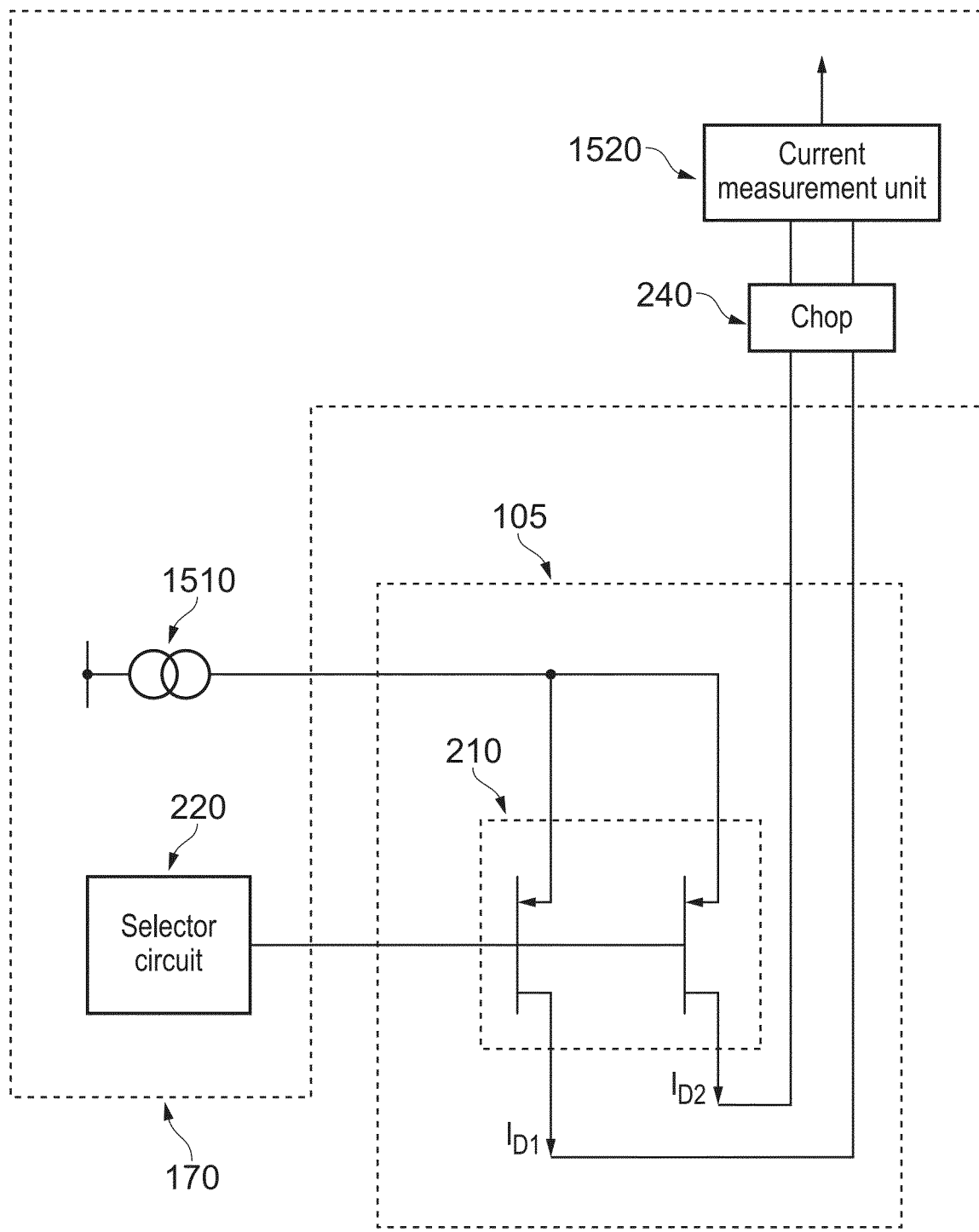
FIG. 15 shows an example schematic representation of a further implementation of a PUF cell.

FIG. 15 shows an example configuration of a PUF cell 105 where the compared transistor on-state characteristic is channel, or drain, current $I_D$. In this arrangement, the matched pair of transistors 210 may be selected by the selector circuit 220, as described above with reference to FIGS. 2 and 3 and they may share a single current source 1510. If the matched pair of transistors 210 were perfectly identical, the channel current $I_{D1}$ through the first transistor of the pair would be identical to the channel current $I_{D2}$ through the second transistor of the pair. However, owing to random manufacturing differences, there is likely to be a difference between $ID_1$ and $I_{D2}$. The determination unit 170 comprises a current measurement unit 1520 configured to measure the difference between the currents, based on which the PUF output can be determined (similarly to the description above with reference to FIG. 3). Optionally, the determination unit 170 may comprise the chop 240 so that any imbalance in the current measurement unit 1520 may be mitigated. In this instance, the current measurement unit 1520 may be configured to determine a first transistor comparison value based on a comparison of $I_{D1}$ and $I_{D2}$, the chop 240 then switches the inputs to the current measurement unit 1520 and the current measurement unit 1520 then determines a second transistor comparison value. The transistor difference value can then be determined based on the first and second transistor comparison values, for example by taking an average or a sum of the first and second transistor comparison values in the case where a chop 240 is not used, or by taking a difference between the first and second transistor comparison values in the case where a chop 240 is used.

Furthermore, whilst in the arrangements of FIGS. 2, 3 and 15, both transistors in the matched transistor pair 210 are selected at the same time so their transistor on-state characteristics can be compared directly against each other, in an alternative implementation each transistor may be selected at a separate time and their transistor on-state characteristic measured. The two measurements may then be compared in order to determine the transistor difference value.

Figure 16:
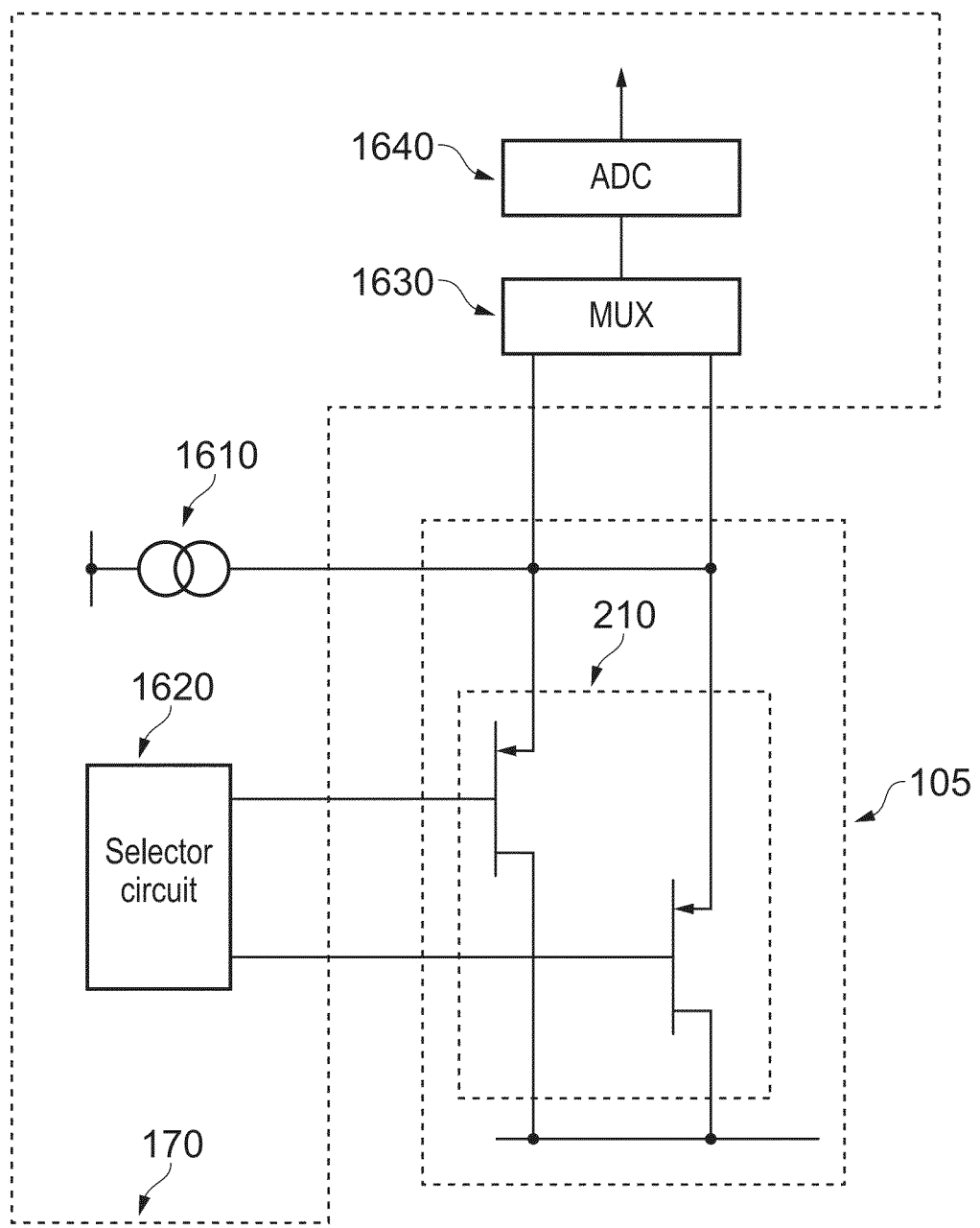
FIG. 16 shows an example schematic representation of a further implementation of a PUF cell.

FIG. 16 shows one particular example implementation of such an arrangement. The determination unit 170 comprises a current source 1610 and a selector circuit 1620 that is configured to apply a selection potential to a first transistor of the matched pair of transistors 1620 and a non-selection potential to a second transistor of the matched pair of transistors 210, so that only the first transistor in the pair is turned on. The MUX 1630 is configured to output the source voltage of the first transistor to the ADC 1640 so that the ADC 1640 can measure the transistor on-state characteristic of the first transistor, which in this example is the source voltage. The selector circuit 1620 may then apply a selection potential to the second transistor and apply a non-selection potential to the first transistor. The MUX 1630 then outputs the source voltage of the second transistor to the ADC 1640 so that the ADC can measure the transistor on-state characteristic of the second transistor. The on-state characteristics of the first and second transistors can then be compared, for example by a PUF output unit or some other suitable unit coupled to the ADC 1640 and configured to receive and record the measurements of the transistor on-state characteristics. The operation of the selector circuit 1620 and MUX 1630 may be controlled by any suitable entity, for example by a control unit in the determination unit 170. Furthermore, the skilled person will appreciate that separately selecting each transistor in a match pair of transistors and measuring their transistor on-state characteristic may be extended to all of the other arrangements described herein by making suitable changes to the configuration, such as those explained above with reference to FIG. 16.

Figure 4:
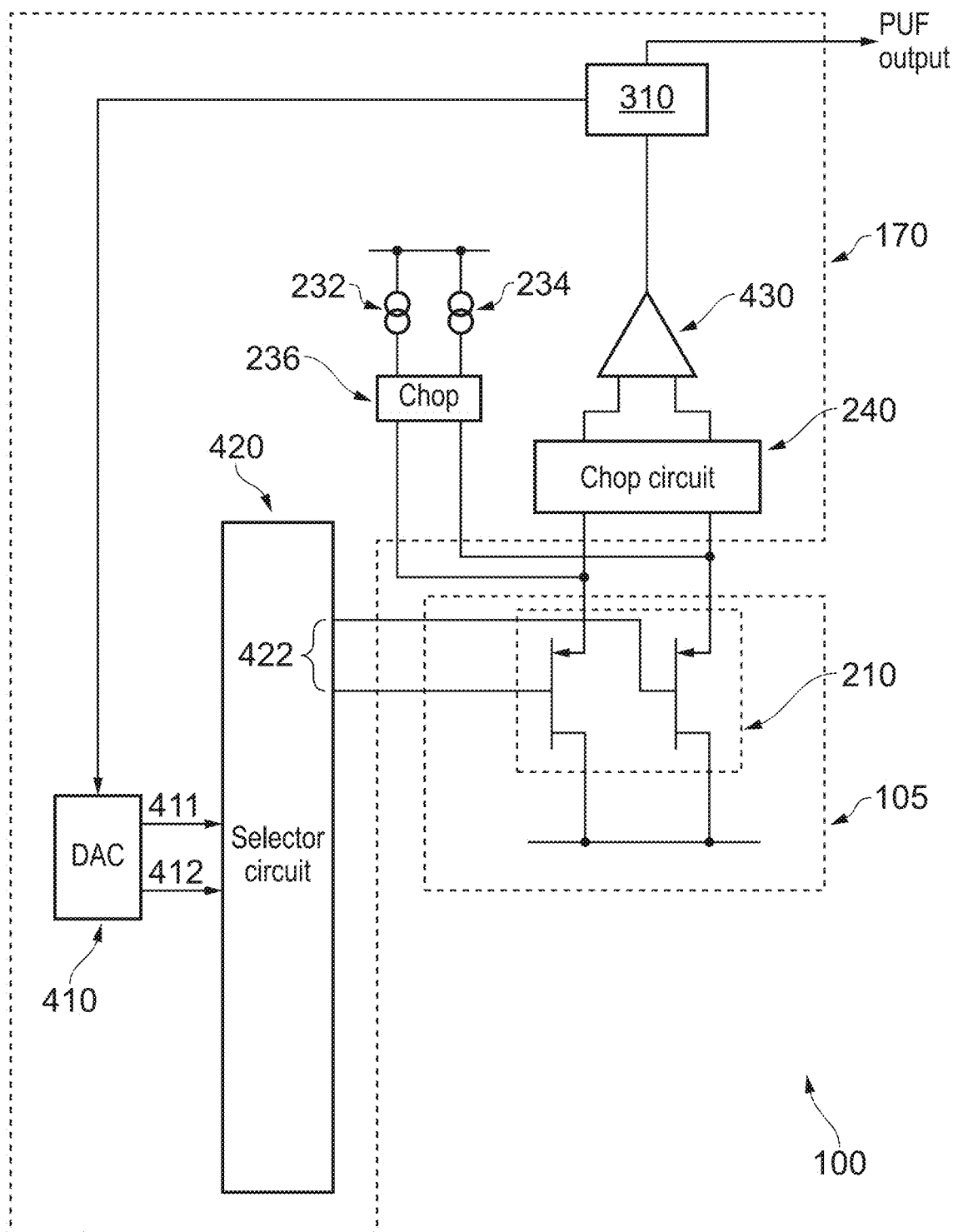
FIG. 4 shows an example schematic representation of a further implementation of a PUF cell and determination unit of the PUF apparatus of FIG. 1.

FIG. 4 shows a further example configuration of the PUF apparatus 100 in accordance with an aspect of the present disclosure. In the PUF apparatus 100 represented in FIG. 4, the PUF cell 105 comprises a matched pair of transistors 210 that are configured as source followers in the same way as FIG. 2. Furthermore, the determination unit 170 comprises a first current source 232, a second current source 234 and a chop 236, all of which operate as described above with reference to FIG. 2. The operation of the first current source 232, second current source 234 and chop 236 may be controlled, for example, but the PUF output unit 310, or any other suitable module/unit.

However, in contrast to the arrangement represented in FIG. 2, the determination unit 170 in this example further comprises a DAC 410, the operation of which is controlled by the PUF output unit 310, and a comparator 430. As will be appreciated from the description below, the DAC 410, PUF output unit 310 and comparator 430 are configured to operate together as a slope converter ADC in order to compare a transistor on-state characteristic of the matched pair of transistors 210. The operation of the determination unit 170 shall now be described with reference to FIG. 5.

The DAC 410 outputs two 'ramp signals'—a first ramp signal 411 that ramps from +full scale to −full scale, and a second ramp signal 412 that ramps from −full scale to +full scale. The PUF output unit 310 controls this operation, for example by supplying an increasing/decreasing digital counter value to the DAC 410, which the DAC 410 converts to an analog ramp signal. To this end, the PUF output unit 310 may comprise at least one counter that is increasing or decreasing in value. This may be seen in the diagram 'DAC ramp signals' in FIG. 5, which shows two repeats of the ramp signals—one for 'conversion 1' and one for 'conversion 2'. The selector circuit 420 is configured to output a pair of voltage signals 422. During 'conversion 1', for the selected row y, a first input signal is applied to a first transistor of the matched pair of transistors 210, comprising a first current signal from the first current source 232 and a first voltage signal from the selector circuit 420. The first voltage signal is the first ramp signal 411. A second input signal is applied to a second transistor of the matched pair of transistors 210, comprising a second current signal from the second current source 234 and a second voltage signal from the selector circuit 420. The second voltage signal is the second ramp signal 412.

Figure 5:
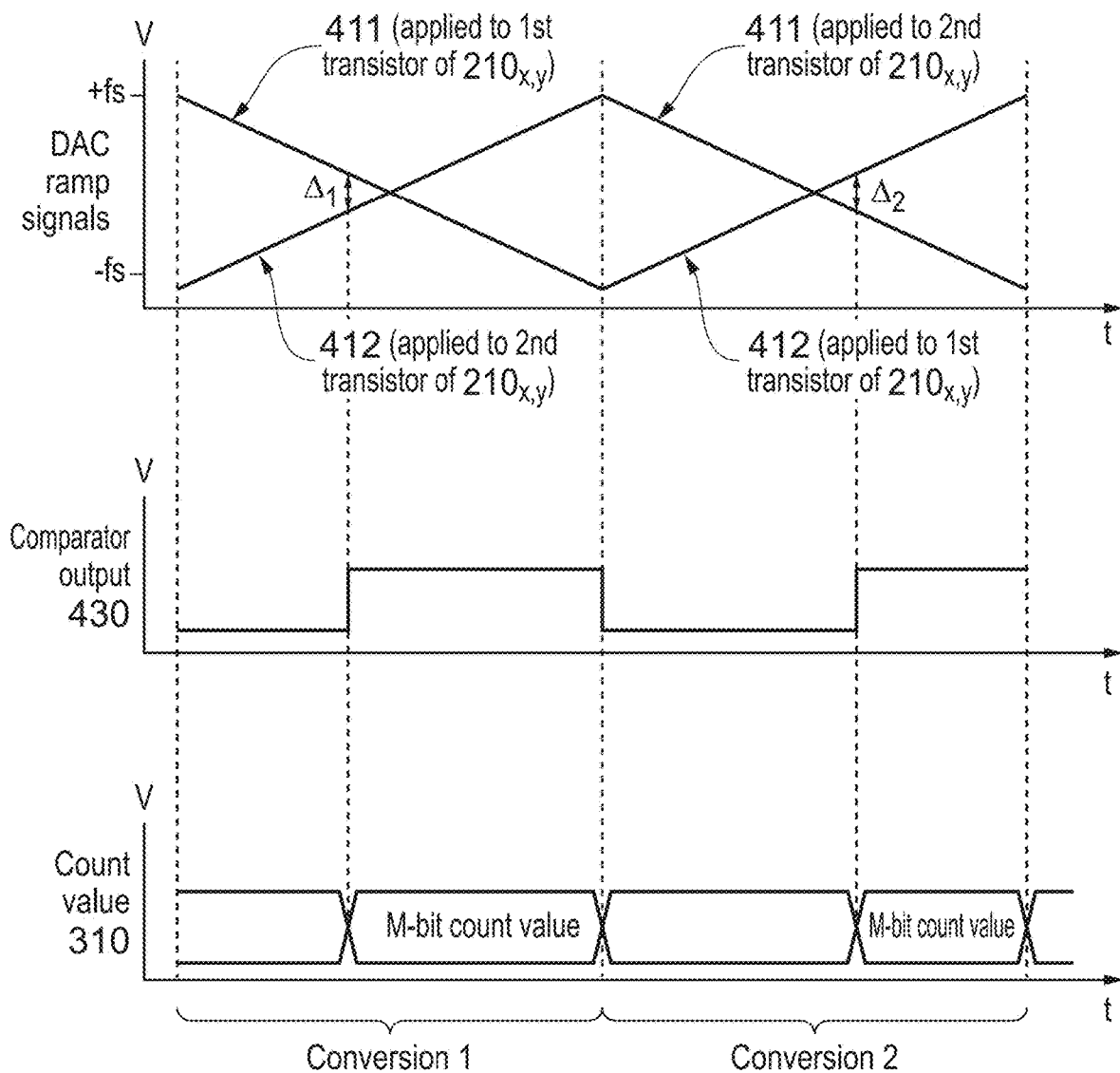
FIG. 5 show a graphic representing operational signals in the of the PUF apparatus of FIG. 4.

It will be appreciated that the source voltages of the matched pair of transistors 210 should vary with the ramp signal applied to the gates of the transistors. The input terminals to the comparator 430 are respectively coupled to the source terminals of the matched pair of transistors 210. As the skilled person will appreciate, the output of the comparator 430 should change from low to high, or vice-versa, when the signal at one input terminal becomes larger than the signal at the other input terminal. With reference to FIG. 5, if the matched pair of transistors 210 were absolutely identical, you would expect the comparator 430 output to change substantially at the moment the two ramp signals 411 and 412 cross (i.e., substantially at the mid-point between −full scale and +full scale). However, due to random manufacturing differences between the two transistors, their turn-on threshold voltages are likely to be different, meaning that for the same gate voltages, their gate-source voltages are likely to be different. Consequently, the moment at which the source voltages cross over and the comparator 430 output changes is unlikely to be the same moment at which the ramp voltages 411 and 412 cross. This is shown in FIG. 5 by $\Delta_1$, which is the difference between the gate voltages of the matched pair of transistors 210 at the moment the comparator 430 output changes. This change in comparator 430 output may trigger the PUF output unit 310 to store the M-bit value of the counter used to control the DAC 410. The M-bit value of the counter at the moment that the comparator 430 output changes is indicative of a difference between the turn-on threshold voltages of the matched pair of transistors 210. This M-bit value is referred to from here on as 'conversion 1'.

However, conversion 1 may be affected by any mismatch between the first and second current sources 232 and 234 and/or any inherent offset between the input terminals of the comparator $430_x$ and/or any delays that are within the circuit.

In some instances, these inaccuracies may be sufficiently small that they can be ignored. In this instance, conversion 1 may be used as the transistor difference value that is indicative of a random manufacturing difference between the matched pair of transistors 210, which has caused a difference in the turn-on threshold voltage/gate-source voltage of the matched pair of transistors 210. In this case, conversion 2 is not required at all and the PUF output may be determined based at least in part on the transistor difference value (as described earlier with reference to FIGS. 2 and 3).

However, in other instances, any one or more of these contributions to inaccuracy may be too great to ignore, without causing an undesirable reduction in the randomness of the transistor difference value, and therefore a reduction in the effectiveness of the PUF apparatus 100 to generate a sufficiently random PUF value. In this case, a second conversion can be carried out, where the input signals to the PUF cell 105 are switched and, optionally, the input terminals to the comparator 430 are switched.

In the second conversion, the first input signal is applied to the second transistor, the first input signal comprising the first current signal from the first current source 232 and the first voltage signal from the selector circuit 420. The first voltage signal is the first ramp signal 411. The second input signal is applied to the first transistor, the second input signal comprising a second current signal from the second current source 234 and a second voltage signal from the selector circuit 420. The second voltage signal is the second ramp signal 412. This switching of the current signals may be achieved by the chop circuit 236 in the same way as described earlier with reference to FIGS. 2 and 3. The switching of the voltage signals may be achieved by the selector circuit 420 changing which of the ramp signals 411 and 422 is applied to which of the pair of voltage signals 422. Optionally, the chop circuit 240 may also switch the inputs to the comparator 430, although in some instances the comparator 430 offset may be sufficiently small for it to be ignored and the chop circuit 240 may be omitted. To this end, the PUF output unit 310 may be configured to control the chop circuit 236, the chop circuit 240 and the selector circuit 420.

FIG. 5 shows the second conversion and it can be seen that the moment at which the comparator 430 output changes, the difference between the ramp voltages is $\Delta_2$. At that time, the PUF output unit 310 may be triggered to store the M-bit count value, which is indicative of a difference between the turn-on threshold voltages of the matched pair of transistors 210. This M-bit value is referred to from here on as 'conversion 2'.

The M-bit count value of conversion 1 may be expressed as:

Conversion 1=$\Delta V_{GS}$+mismatch/offset+delay+noise1

In this example, conversion 1 is a first transistor comparison value.

The M-bit count value of conversion 2 may be expressed as:

Conversion 2=$-\Delta V_{GS}$+mismatch/offset+delay+noise2

In this example, conversion 2 is a second transistor comparison value.

It can be seen that the sign of $\Delta V_{GS}$ has changed between conversion 1 and conversion 2, as a result of switching the input voltage signals. Thus, if we take the difference between conversion 1 and conversion 2, we are left with:

Transistor difference value=conversion 1−conversion 2=2*$\Delta V_{GS}$+(noise1-noise2)

Therefore, by taking two conversions in this way and subtracting one from the other, any correlated errors and noise between the two conversions, such as mismatch/offset and delay in the circuit, may be significantly reduced or eliminated to the first order. Furthermore, the $\Delta V_{GS}$ component has increased by 2× and low frequency components of noise1 and noise2 should mostly cancel each other out. Consequently, the accuracy of the transistor difference value as a measure of the difference between the gate-source voltages of the matched pair of transistors 210 is increased. The PUF output may be determined based at least in part on the transistor difference value (as described earlier with reference to FIGS. 2 and 3), which, owing to the increase in accuracy of the transistor difference value, may be a more reliably random number.

It should be appreciated that in this example both the first voltage signal and the second voltage signal applied to the matched pair of transistors 210 are ramp signals, which may help to improve the common mode rejection ratio (CMRR) of the circuit and make the measurement process more purely differential. However, in alternative implementations, only one of the first voltage and second voltage signals may be a ramp voltage (either increasing or decreasing), with the other voltage signal being a static reference voltage that is set to any suitable value between the upper and lower limits of the ramp signal.

In a further alternative implementation, the ADC comprising the DAC 410, comparator 430 and PUF output unit 310 may be configured as a SAR ADC, for example by virtue of the PUF output unit 310 controlling the DAC 410 differently by applying digital values to the DAC 410 in accordance with the operation of a SAR ADC, rather than in accordance with the operation of a slope ADC. In this alternative, the PUF output unit 310 may not comprise a counter, but may instead set the digital value in any other suitable way in accordance with the operation of a SAR ADC. Using a SAR ADC may help to improve the speed of the conversion, but would require a separate DAC to be allocated to each PUF cell $105_{x,y}$ in a row, since the DAC input for a SAR ADC cannot be shared amongst all cells in a row.

Figure 6:
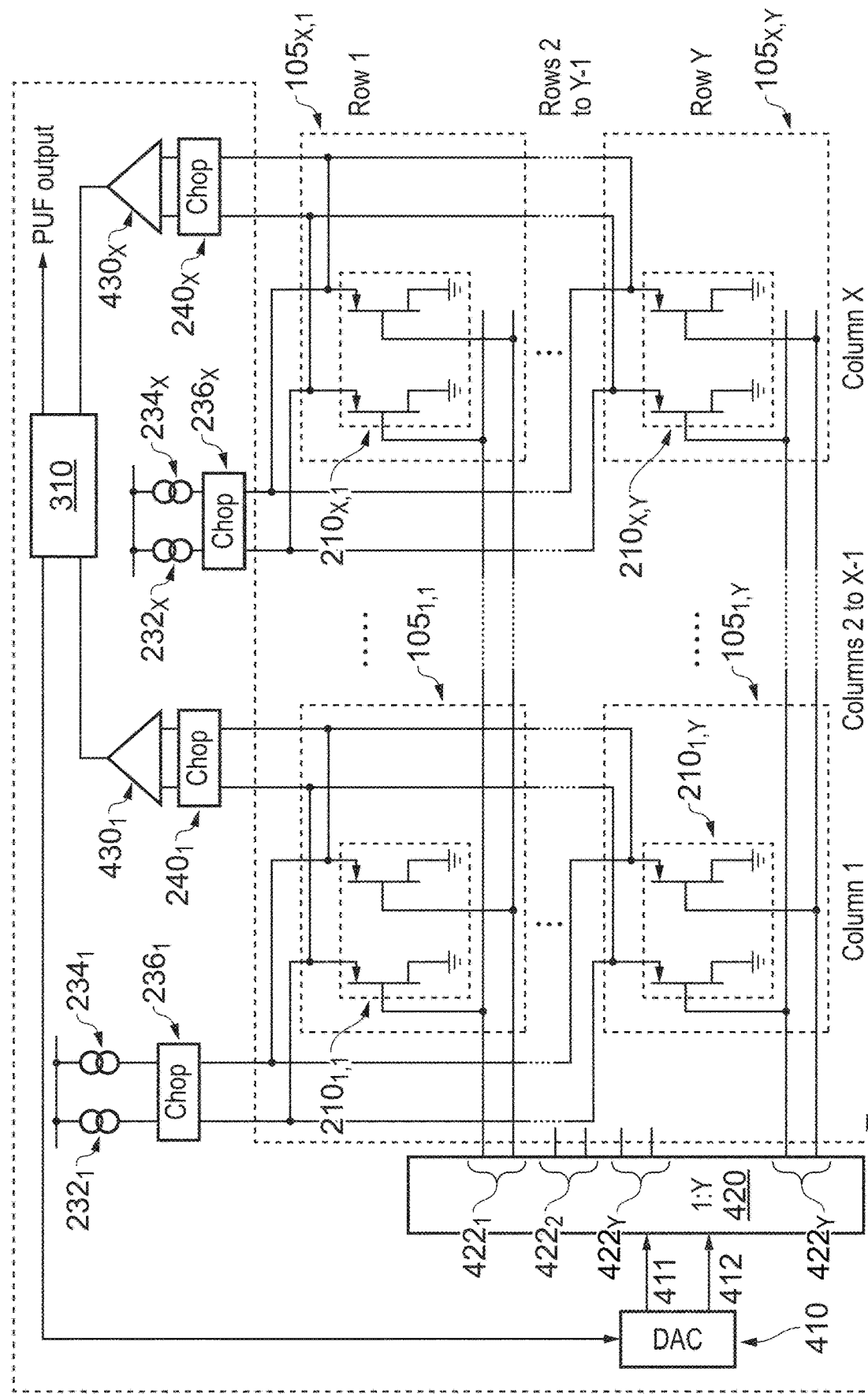
FIG. 6 shows an example schematic representation of an array of the PUF cells of FIG. 4.

FIG. 6 shows a schematic diagram of an array of PUF cells $105_{x,y}$ that are each configured in the same way as the PUF cell 105 represented in FIG. 4. As can be seen, the selector circuit 420 has Y pairs of voltage signals $422_y$. As explained earlier, by setting one of the pairs of voltage signals $422_y$ to a selection potential (which in this example is the two ramp signals 411 and 412), all of the PUF cells $105_{x,y}$ in that row are selected. The other pairs of voltage signals $422_y$ output from the selector circuit 420 are held at a non-selection potential, which is below the turn-on threshold voltage of the matched pairs of transistors $210_{x,y}$, so that the transistors in the other rows of PUF cells $105_{x,y}$ are turned off and are therefore not selected. For each column of PUF cells $105_{x,y}$ there is provided a first current source $232_x$, a second current source $234_x$, a chop circuit $236_x$, a further chop circuit $240_x$ and a comparator $430_x$. The PUF output unit 310 is configured to receive the output of each of the comparators $430_x$, such that for each column it may store the counter value at the time that the respective comparator $430_x$ output switches. The PUF output unit 430, or any other suitable unit, may control the operation of the DAC 410, the selector circuit 420, the chop circuit $236_x$ and the further chop circuit $240_x$, as described above.

In operation, the selector circuit 420 may select a row of PUF cells $105_{x,y}$, for example the first row of PUF cells $105_{x,1}$. A transistor difference value may be determined for each of the selected PUF cells in parallel. The selector circuit 420 may then select a different row of PUF cells $105_{x,y}$, for example the second row of PUF cells $105_{x,2}$. A transistor difference value may then be determined for each of the selected PUF cells in parallel. In this way, transistor difference values may be determined for all of the PUF cells $105_{x,y}$, and the PUF output may then be determined by the PUF output unit 310 based on the transistor difference values, as described earlier with respect of FIG. 3.

In some implementations, the number of PUF cells $105_{x,y}$ may exceed the number of bits in the PUF output. In this case, during enrollment of the PUF apparatus 100, the transistor comparison described above may be carried out for all of the PUF cells $105_{x,y}$. The PUF cells $105_{x,y}$ that are found to have the largest difference in turn-on threshold voltage between the transistors may then be registered for use in determining the PUF output in the future. The remaining PUF cells $105_{x,y}$ may effectively be ignored from then on. By using only the PUF cells $105_{x,y}$ with the largest difference in turn-on threshold voltage, the persistence of the PUF output may be improved, since changes over time in the magnitude of a difference in the transistor on-state characteristic (for example, caused by component drift, measurement noise, etc) are less likely to cause a change in which of the two transistors has the largest turn-on threshold voltage.

By determining the transistor difference values in parallel for the X pairs of transistors $210_{x,y}$ in a selected row, the speed of operation of the PUF apparatus 100 may be increased. Furthermore, each set of first and second current sources $232_x$ and $234_x$, chop circuits $236_x$, further chop circuits $240_x$ and ADC $250_x$ may be shared by a column of the PUF array, thereby reducing the number of components required and thus the overall size, cost and power consumption of the PUF apparatus 100. Furthermore, the determination unit 170 need comprise only one DAC 410 and one counter (or similar) in the PUF output unit 310, thereby maximising resource sharing across the PUF array and minimising the number of components required and thus the overall size, cost and power consumption of the PUF apparatus 100. Consequently, the PUF apparatus 100 can be made relatively small, dense and low power.

It should be appreciated that in an alternative implementation of the PUF apparatus 100 represented in FIGS. 4 and 6, the PUF apparatus 100 may be configured to determine a transistor difference value for one or more PUF cells $105_{x,y}$ based on a different transistor on-state characteristic, such as that described above with reference to FIG. 15.

Figure 7:
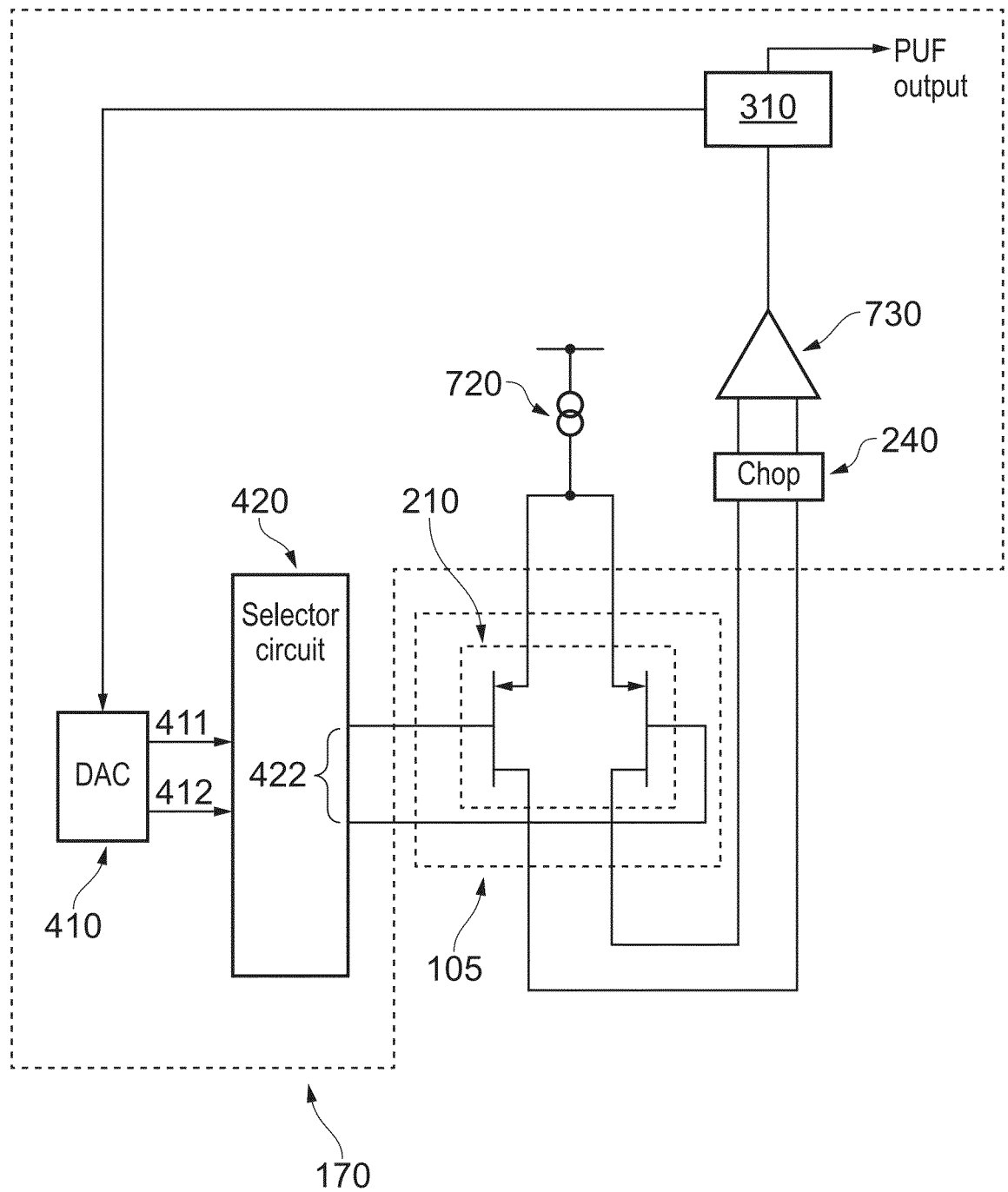
FIG. 7 shows an example schematic representation of a further implementation of a PUF cell and determination unit of the PUF apparatus of FIG. 1.

FIG. 7 shows a further example configuration of the PUF apparatus 100 in accordance with an aspect of the present disclosure. The PUF apparatus 100 represented in FIG. 7 is very similar to that represented in FIG. 4, except that the PUF cell 105 comprises a matched pair of transistors 210 that are configured as a differential pair and a single current source 720 can be provided for the tail current of the differential pair. Furthermore, the comparator 730 may be implemented differently to the comparator 430 of FIG. 4, as explained in more detail later.

The comparator 730 is coupled to the drains of the matched pair of transistors 210, such that the output of the comparator 730 should change when one of the drain currents becomes larger than the other. Since the gate voltage of each transistor is held to the potential of the pair of voltages 422 and the source voltage of each transistor is held by the current source 720, random manufacturing differences between the matched pair of transistors 210 (for example, causing differences in turn-on threshold voltages, and therefore gate-source voltages) may be detected by virtue of differences in the drain currents of the matched pair of transistors 210. In order to determine the transistor difference value, two conversions may be executed as described above with reference to FIG. 5, the only differences being that because there is a single current source 720, the first input signal comprises only a first voltage signal (the first ramp signal 411) and the second input signal comprises only a second voltage signal (the second ramp signal 412), and that the comparator 730 output changes when the drain currents of the matched pair of transistors 210 crosses over (rather than when the source voltages cross over). Each conversion generates a transistor comparison value that is indicative of a difference in the turn-on threshold voltage/ $V_{GS}$ of the matched pair of transistors 210.

As explained earlier, the M-bit count value of conversion 1 may be expressed as:

Conversion 1=$\Delta V_{GS}$+offset+delay+noise1

Conversion 1 is a first transistor comparison value and offset is the offset of comparator 730.

The M-bit count value of conversion 2 may be expressed as:

Conversion 2=$\Delta V_{GS}$+offset+delay+noise2

Conversion 2 is a second transistor comparison value.
As explained earlier:

Transistor difference value=Conversion 1−conversion 2=2*$\Delta V_{GS}$+(noise1−noise2)

Therefore, a transistor difference value indicative of $\Delta V_{GS}$, and therefore indicative of random manufacturing differences, can be determined more accurately by mitigating the offset and delay inaccuracies. However, as explained earlier, in some implementations where the offset and delay are considered to be sufficiently small to be ignored, the transistor difference value may be found from a single conversion, such that conversion 1, or conversion 2, is the transistor difference value.

Furthermore, whilst in this example the first voltage signal is the first ramp signal 411 and the second voltage signal is the second ramp signal 412, in an alternative only one of the voltage signals may be a ramp signal (either ramping up or down) and the second voltage signal may be a fixed voltage reference, fixed to any suitable value (as described earlier). In a further alternative, rather than operating as a slope ADC, the PUF output unit 310 may be configured to drive the DAC 410 such that the ADC operates as an SAR ADC, as explained earlier.

The inventors have recognised that by implementing the matched pair of transistors 210 as a differential pair, the matched pair of transistors 210 may form the input transistors of the comparator 730. This may be appreciated more fully from FIG. 8.

Figure 8:
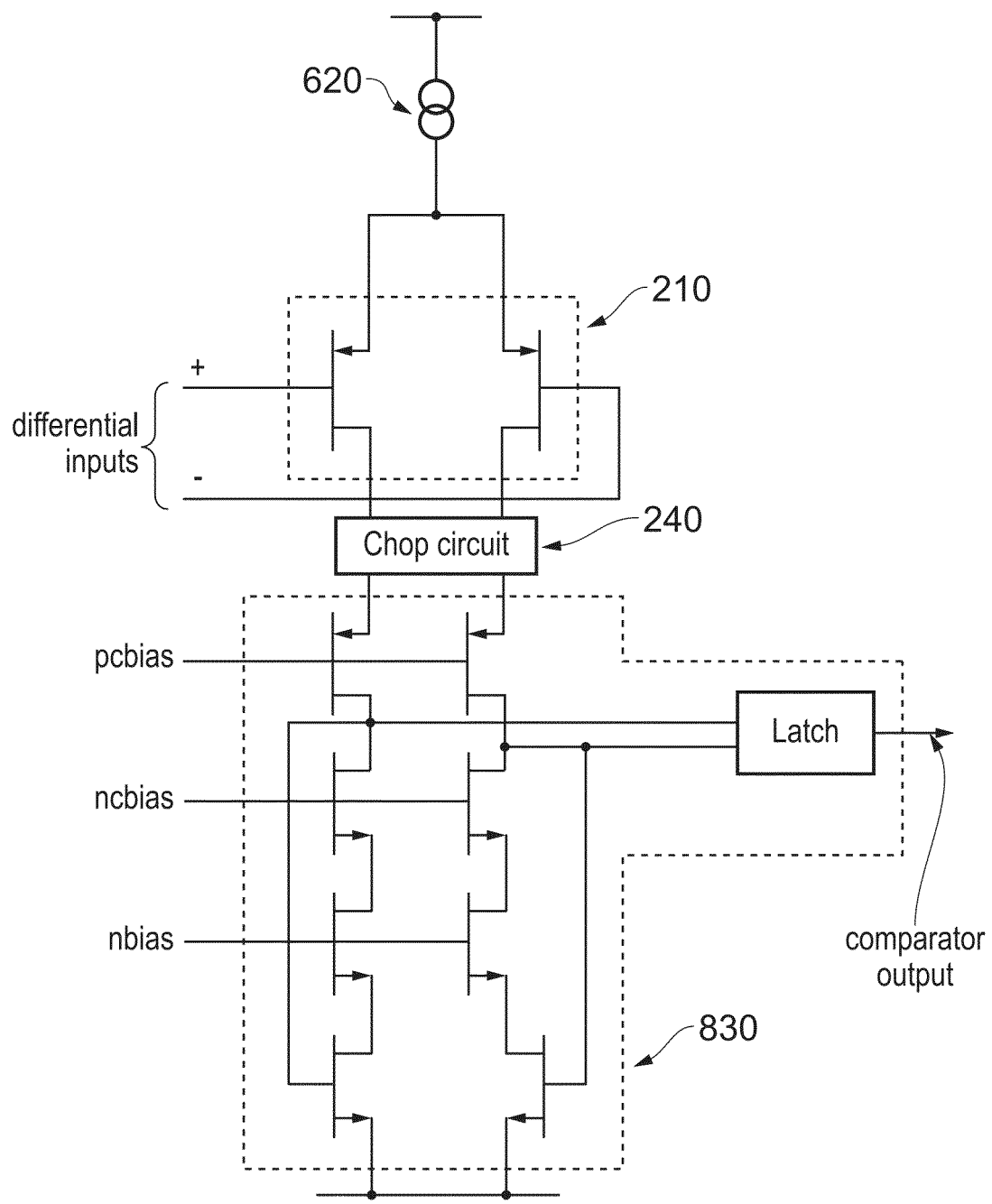
FIG. 8 shows a schematic diagram illustrating a pair of transistors and a partial comparator block.

FIG. 8 shows a schematic diagram illustrating the matched pair of transistors 210 and the partial comparator block 830, which together form a full comparator. As the skilled person will appreciate, the matched pair of transistors 210 form the differential pair at the input of the full comparator, wherein the differential input of the full comparator is applied to the gates of the differential pair. The skilled person will also recognise that the transistors in the partial comparator block 830 make up the rest of a pre-amplifier of the full comparator and the latch circuit completes the full comparator. Thus, the determination unit 170 in this example where the matched pair of transistors 210 form a differential pair may be configured with both a full comparator 730 and the matched pair of transistors 210, or it may be configured with a partial comparator block 830 and the matched pair of transistors 210.

Figure 9:
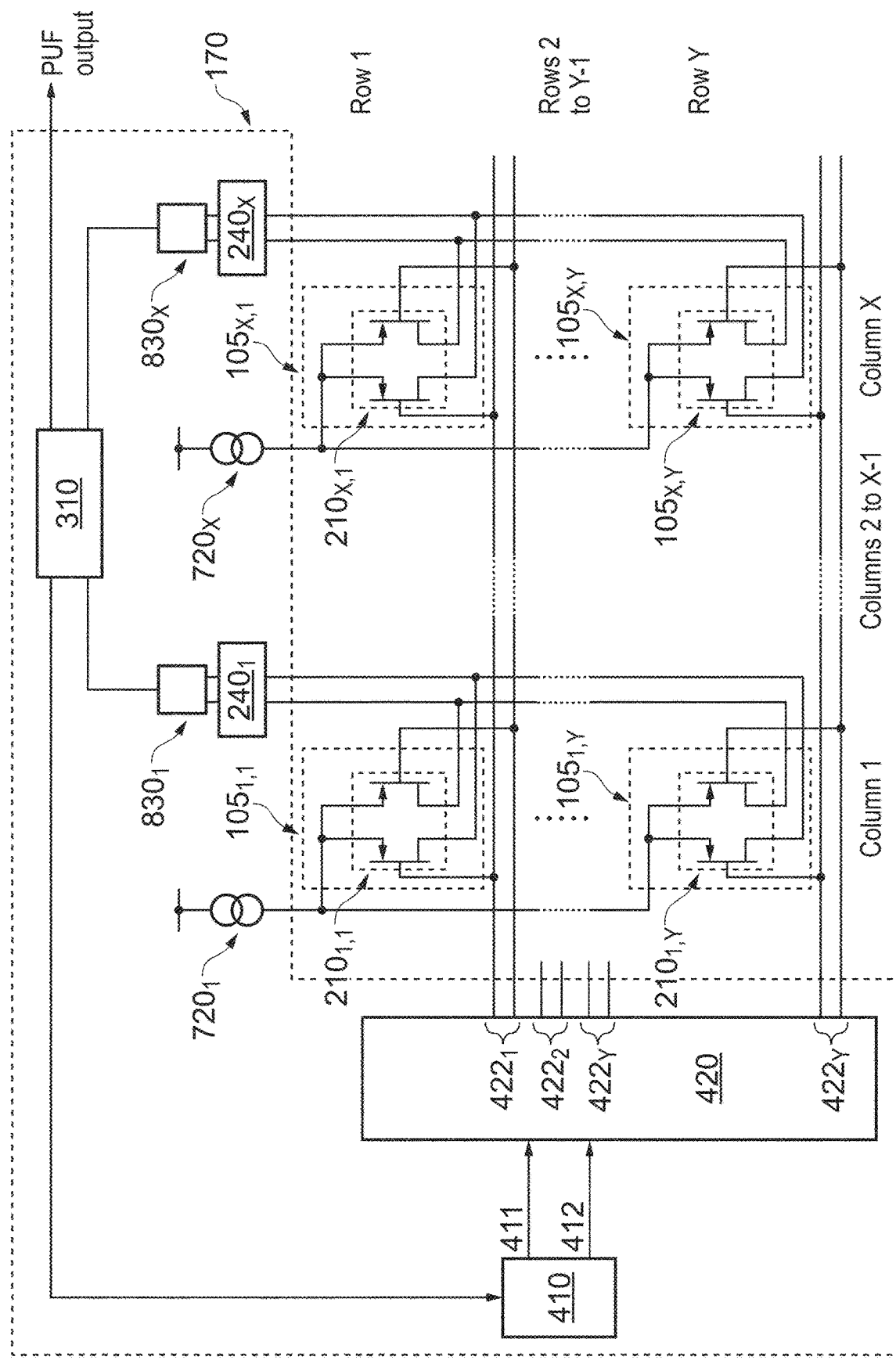
FIG. 9 shows an example representation of an array of PUF cells comprising the pair of transistors of FIG. 8 and a determination unit comprising the partial comparator block of FIG. 8.

FIG. 9 shows an example representation of an array of PUF cells $105_{x,y}$ in accordance with this aspect of the disclosure, wherein the partial comparator block $830_x$ is used. The determination of the transistor difference value(s) and the PUF output can be understood from the earlier description with respect to FIGS. 4, 6 and 7. However, it can be appreciated from FIG. 10 that by utilising the partial comparator block $830_x$, two fewer transistors per column are required, since the input differential pair of the full comparator for column x is formed by the selected matched pair of transistors $210_{x,y}$ in column x. This further reduces the overall size and power consumption of the PUF apparatus 100, thereby increasing density and reducing costs. Furthermore, it means that any comparator offset caused by the input differential pair 210 of the full comparator is actually caused by $\Delta V_{GS}$ and, as such, does not contribute to the 'offset' component of 'Conversion 1' and 'Conversion 2' described above. Since fewer components now contribute to the undesirable 'offset' component (only the components in the partial comparator block 830, which have a relatively small influence on input referred offset), it may reduce 'offset' to a level where it can be ignored, such that only a single conversion may be required to determine the transistor difference value, in which case the further chop circuit $240_x$ may be omitted. However, in some cases the offset of the partial comparator block 830 may be sufficient to require the further chop circuit $240_x$ and the two conversions described above.

Transistor matched pair layout

Example transistor layouts for the matched pair of transistors $210_{x,y}$ shall now be described.

The inventors have recognised gradients across a PUF cell in the thickness/doping concentration/impurities of one or more semiconductor layers may adversely affect the randomness of the difference between the two transistors making up the matched transistor pair $210_{x,y}$. For example, if the thickness of the gate oxide layer gradually increases across the die from one end to another, then the gate oxide thickness on one of the transistors may always be slightly greater than the other transistor. For example, looking at FIGS. 3, 6 and 9, if the gate oxide thickness has an increasing gradient across the PUF cell array from left to right, in each PUF cell $105_{x,y}$, the transistor on the left side of each PUF cell $105_{x,y}$ is more likely to have a slightly thinner gate oxide than the transistor on the right side of each PUF cell $105_{x,y}$. This may skew the probably of the transistor comparison away from 50:50, such that the chances of one transistor having a larger transistor on-state characteristic (such as $V_{TH}$, or $V_{GS}$, or $I_D$) than the other transistor is no longer 50:50.

It has been determined that this effect may be reduced by designing the matched pair of transistors $210_{x,y}$ to be as small as possible and as close together as possible. Furthermore, it has also been determined that a so-called, 'common centroid' arrangement may further improve gradient rejection, thereby improving the probability of the transistor comparison being substantially 50:50.

FIG. 10 shows an example representation transistor positioning to help explain a 'common centroid' arrangement. In FIG. 10A, the first transistor $T_A$ and the second transistor $T_B$, that together make up the matched pair of transistors $210_{x,y}$, are positioned a long way apart. In this case, the matched pair of transistors $210_{x,y}$ are likely to be susceptible to gradients, particularly in the up/down direction in the drawing. FIG. 10B shows a similar arrangement, but where the first transistor $T_A$ and the second transistor $T_B$ are positioned close together. This may help to reduce the effect of gradients, particularly in the up/down direction in the drawing.

Figure 10A:
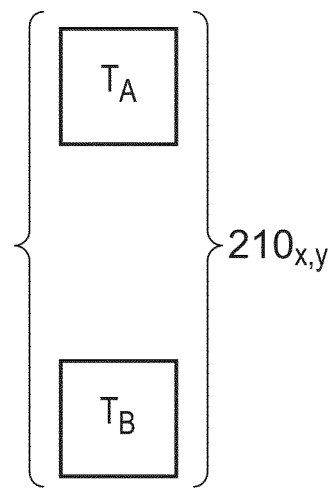
FIGS. 10A-10D show an example schematic representation of an arrangement of a pair of transistors.
Figure 10B:
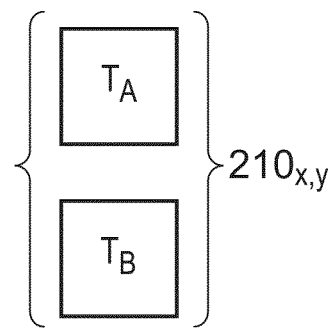
Figure 10C:
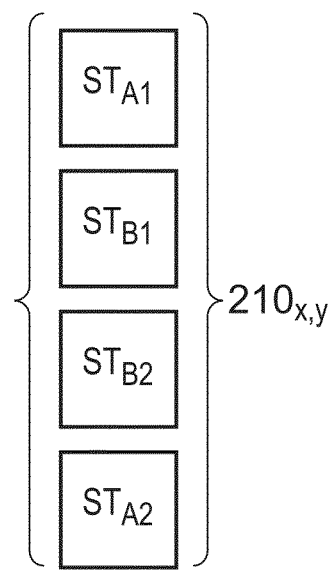

FIG. 10C shows one example 'common centroid' arrangement. In this example, the first transistor $T_A$ is made up of a first sub-transistor $T_{A1}$ and a second sub-transistor $T_{A2}$. The second transistor $T_B$ is made up of a third sub-transistor $T_{B1}$ and a fourth sub-transistor $T_{B2}$. Owing to the positioning of the sub-transistors, the centroid, or centre of mass, of the first transistor $T_A$ is in substantially the same position as the centroid, or centre of mass, of the second transistor $T_B$. Consequently, the overall effect of any linear or first order gradient across the PUF cell $105_{x,y}$ should be evened out for the matched pair of transistors $210_{x,y}$, thereby achieving gradient rejection.

Figure 10D:
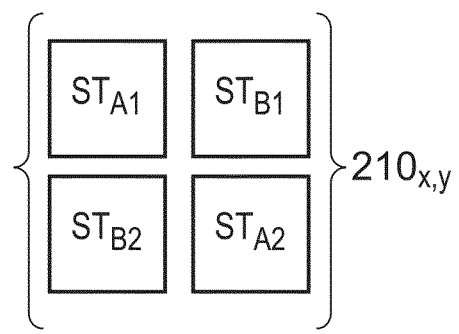

FIG. 10D shows a further example 'common centroid' arrangement. Again, owing to the positioning of the sub-transistors, the centroid, or centre of mass, of the first transistor $T_A$ is in substantially the same position as the centroid, or centre of mass, of the second transistor $T_B$. Consequently, the overall effect of any gradient across the PUF cell $105_{x,y}$ should be evened out for the matched pair of transistors $210_{x,y}$, thereby achieving gradient rejection.

Details of an example 'common centroid' arrangement shall now be described with reference to FIGS. 11-13.

Figure 11A:
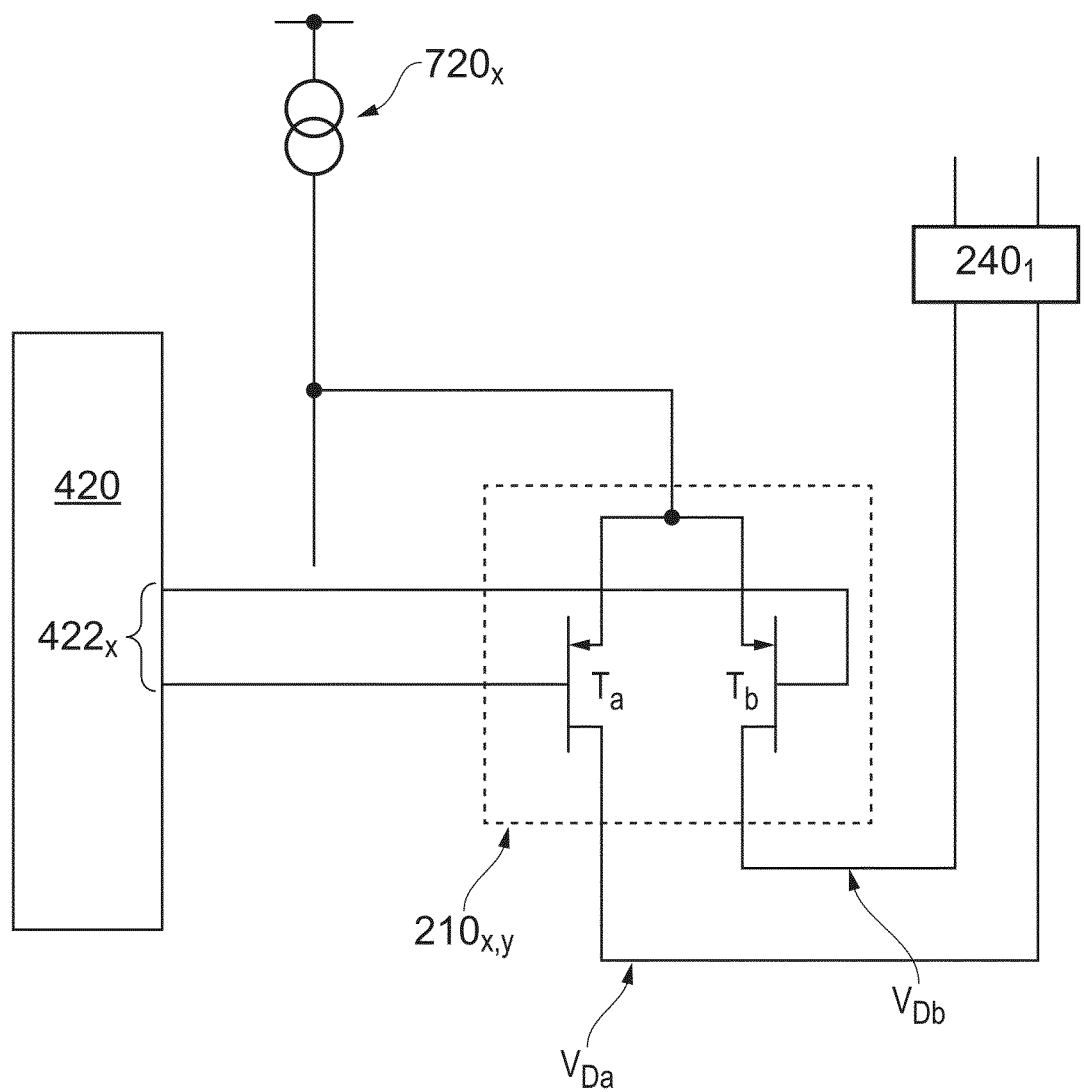
FIG. 11A shows an example schematic representation of a pair of transistors.

FIG. 11A shows an example representation of a matched pair of transistors $210_{x,y}$. This is a simplified representation of part of the PUF apparatus described above with reference to FIG. 7. The first transistor of the matched pair of transistors $210_{x,y}$ is labelled $T_A$ and the second transistor of the pair is labelled $T_B$. The drain voltage of the first transistor $T_A$ is labelled $V_{Da}$ and the drain voltage of the second transistor $T_B$ is labelled $V_{Db}$.

Figure 11B:
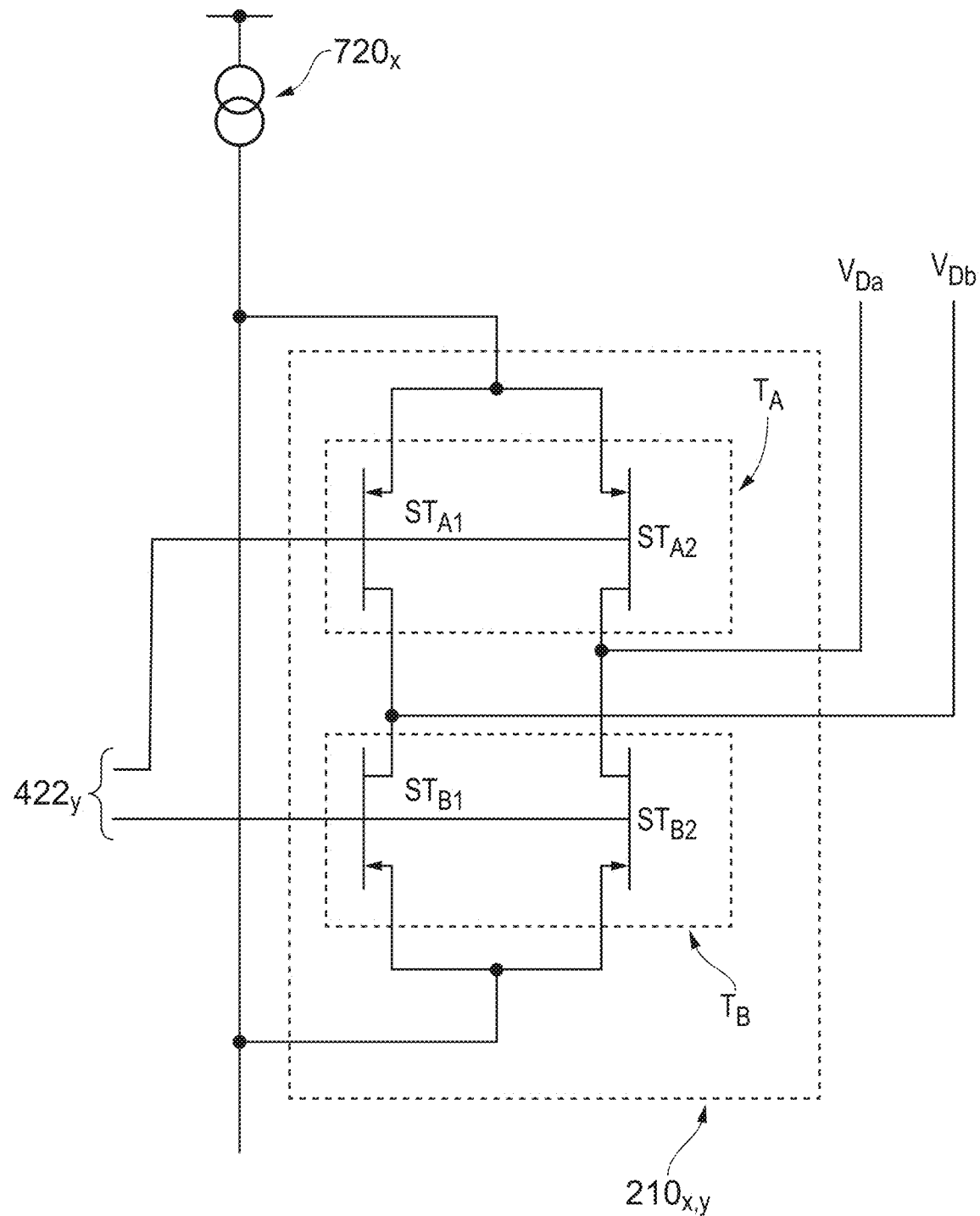
FIG. 11B shows an example schematic representation of the pair of transistors of FIG. 11A implemented by sub-transistors.

FIG. 11B shows an example representation of how the matched pair of transistors $210_{x,y}$ may be implemented by sub-transistors. The first sub-transistor $T_A$ comprises a first sub-transistor $ST_{A1}$ and a second sub-transistor $ST_{A2}$. The second transistor $T_B$ comprises a third sub-transistor $ST_{B1}$ and a fourth sub-transistor $ST_{B2}$.

Figure 12:
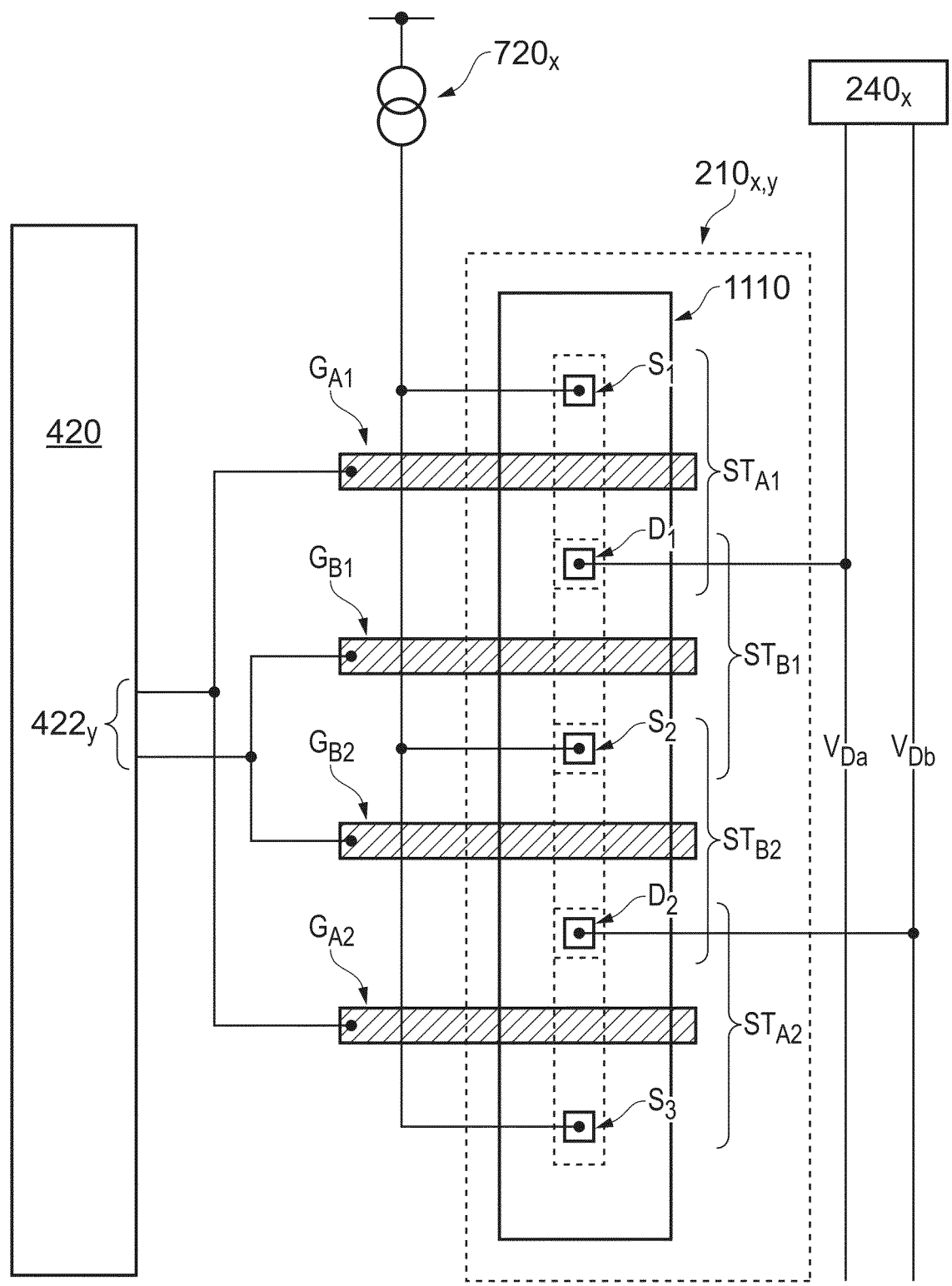
FIG. 12 shows an example semiconductor layout of the sub-transistors of FIG. 11B.

FIG. 12 shows an example semiconductor layout of the matched pair of transistors $210_{x,y}$ represented in FIG. 11B. The matched pair of transistors $210_{x,y}$ are arranged to have a common centroid configuration, corresponding to that represented in FIG. 10C. A doped well or back gate region (for example, an n-type substrate for a p-type FET) is represented by reference numeral 1110. The first sub-transistor $ST_{A1}$ comprises a source contact $S_1$ and a drain contact $D_1$, each of which may be highly doped well regions within the semiconductor substrate (for example, p+wells for a p-type FET). The first sub-transistor $ST_{A1}$ also comprises a gate $G_{A1}$. The third sub-transistor $ST_{B1}$ comprises a source contact $S_2$ and the drain contact $D_1$, each of which may be highly doped well regions within the semiconductor substrate (for example, p+wells for a p-type FET). Thus, it can be seen that the first and third sub-transistors share the drain contact $D_1$. The third sub-transistor $ST_{B1}$ also comprises a gate $G_{B1}$. The fourth sub-transistor $ST_{B2}$ comprises the source contact $S_2$ and a drain contact $D_2$, each of which may be highly doped well regions within the semiconductor substrate (for example, p+wells for a p-type FET). Thus, it can be seen that the third and fourth sub-transistors share the source contact $S_2$. The fourth sub-transistor $ST_{B2}$ also comprises a gate $G_{B2}$. The second sub-transistor $ST_{A1}$ comprises a source contact $S_3$ and the drain contact $D_2$, each of which may be highly doped well regions within the semiconductor substrate (for example, p+wells for a p-type FET). Thus, it can be seen that the second and fourth sub-transistors share the drain contact $D_2$. The second sub-transistor $ST_{A2}$ also comprises a gate $G_{A2}$.

By sharing source and drain contacts in this way, the matched pair of transistors $210_{x,y}$ may be made smaller, whilst still achieving a common-centroid arrangement. Not only does this help to reduce/eliminate gradient effects, but it also means that the PUF array may be more densely packed with pairs of transistors $210_{x,y}$, thereby reducing the size of the PUF apparatus 100. For example, the semiconductor design represented in FIG. 12 may be fabricated to the following dimensions:

X pitch=1.66 um
Y Pitch=3.6 um
Area=5.976 um^2
Process dimension=0.18 um
Cell area (normalised to process minimum dimension) =33.2 F^2

Since each PUF cell $105_{x,y}$ may comprise only the matched pair of transistors $210_{x,y}$, it is therefore possible to each PUF cell $105_{x,y}$ to achieve the dimensions identified above, whilst also achieving a common centroid arrangement. This means that a very small, high density PUF array may be achieved.

It should be noted that if a non-common centroid arrangement were instead used, it would be possible to halve the Y pitch and achieve a PUF cell $105_{x,y}$ of half the area identified above. Whilst such an arrangement would not have the benefits of the common centroid arrangement, it may result in an even smaller, higher density PUF array.

Figure 13:
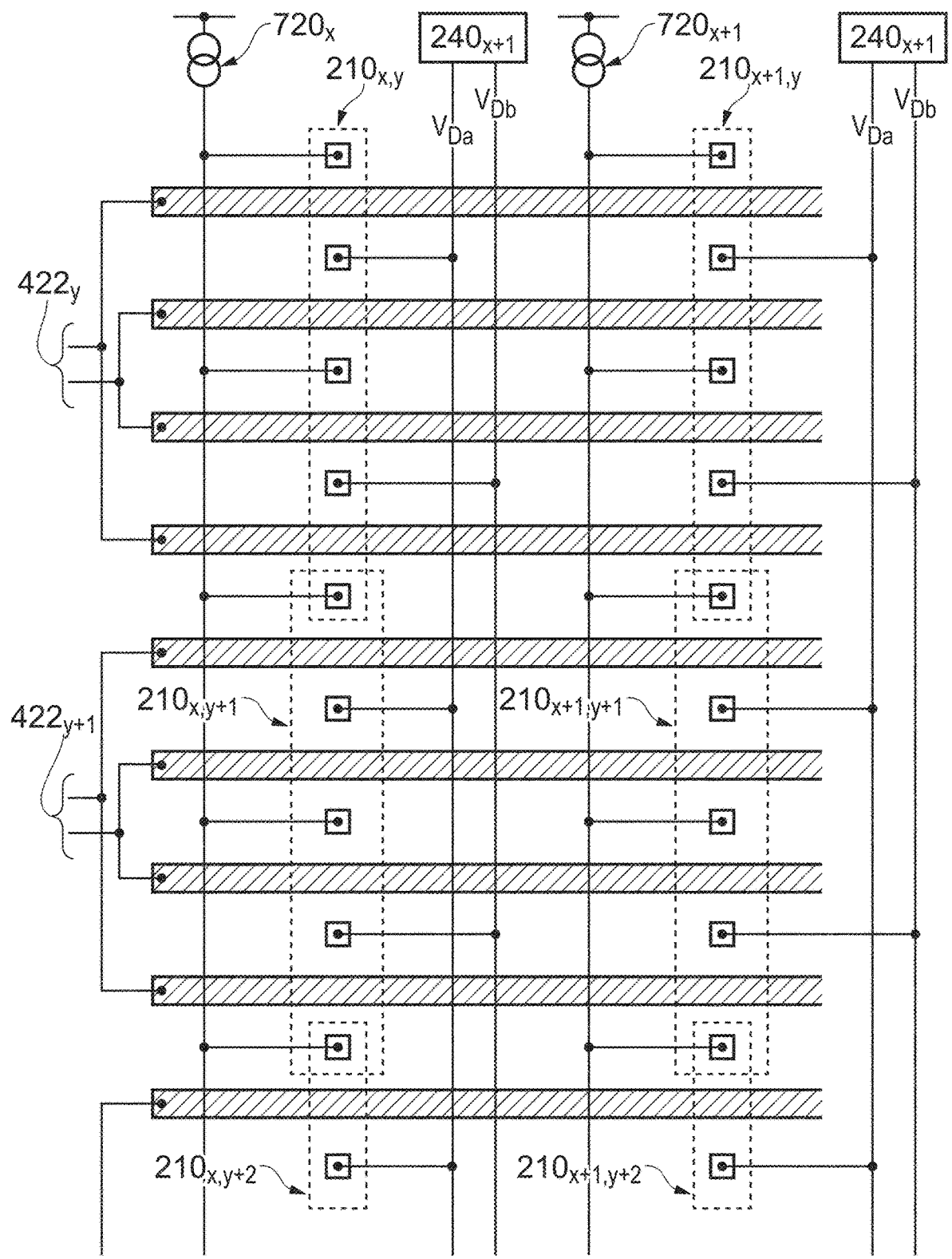
FIG. 13 shows an example schematic representation of an array of the semiconductor layout of FIG. 12.

FIG. 13 shows an example representation of how the transistor layout of FIG. 12 may be used to create an array of PUF cells $105_{x,y}$. The PUF array represented in FIG. 13 corresponds with that represented in FIG. 9. As can be seen, adjacent pairs of transistors $210_{x,y}$ in a column are arranged to share source contacts. For example, the source contact of the second sub-transistor $ST_{A2}$ in the transistor pair $210_{x,y}$ is shared with the source contact of the first sub-transistor $ST_{A1}$ in the transistor pair $210_{x,y+1}$. This not only increases the density of packing of the PUF cells $105_{x,y}$, but it also reduces the number of interconnections required to the current source $720_x$ in each column, thereby simplifying manufacturing and reducing wiring/via complexity. It will be appreciated that whilst in this example adjacent PUF cells $105_{x,y}$ share source contacts, in alternative configurations (for example, one corresponding to the arrangement represented in FIG. 3) they may alternatively share drain contacts. Thus, adjacent pairs of transistors $210_{x,y}$ in a column may be arranged to share channel contacts, either source or drain.

In the layout represented in FIGS. 12 and 13, the sub-transistors are configured such that when the first transistor $T_A$ is conducting current, a channel current in the first sub-transistor $ST_{A1}$ flows from drain $D_1$ to source $S_1$ in a first direction in the semiconductor. This first direction appears as 'upwards' in the representation shown in FIG. 12. A channel current in the second sub-transistor $ST_{A2}$ flows from drain D2 to source S3 in a second direction in the semiconductor, which is substantially opposite to the first direction. This second direction appears as 'downwards' in the representation shown in FIG. 12. When the second transistor $T_B$ is conducting current, a channel current in the third sub-transistor $ST_{B1}$ flows from $D_1$ to source $S_2$ in the second direction and a channel current in the fourth sub-transistor $ST_{B2}$ flows from drain $D_2$ to source $S_2$ in the first direction (although it will be appreciated that in an alternative, the positions of the third sub-transistor $ST_{B1}$ and fourth sub-transistor $ST_{B2}$ may be switched, such that the channel current in the third sub-transistor $ST_{B1}$ flows in the first direction and the channel current in the fourth sub-transistor $ST_{B2}$ flows in the second direction.

By arranging the sub-transistors so that the channel current in each sub-transistor making up a transistor flows in substantially opposite directions, gradient effects may be further cancelled out, thereby improving gradient rejection and, therefore, the randomness of the transistor difference value.

Whist FIGS. 12 and 13 show one particular example of how the sub-transistors may be arranged to achieve common centroid, channel contact sharing and substantially opposite channel current directions, the sub-transistors may be arranged differently and still achieve some or all of these effects. For example, the arrangements may differ for difference types of transistor (such as n-type or p-type, etc) and/or they may be arranged in a different common-centroid configuration, such as that of FIG. 10D.

Figure 17:
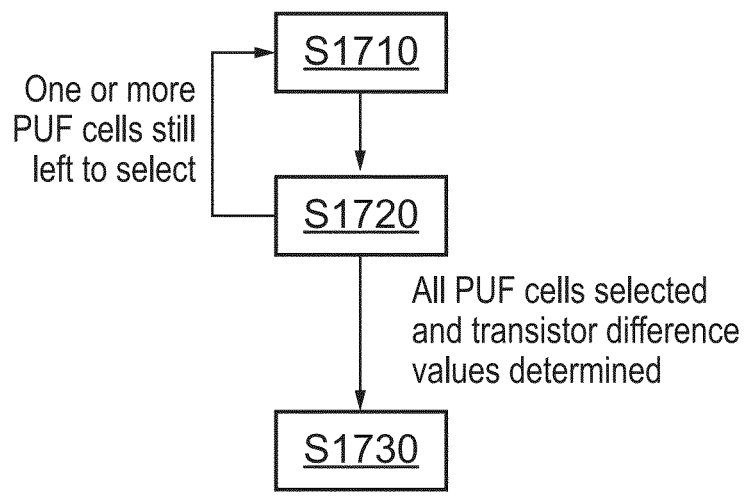
FIG. 17 shows a graphical representation of a method for determining a PUF output using a plurality of PUF cells.

FIG. 17 shows a graphical representation of a method for determining a PUF output using a plurality of PUF cells. This method may be performed by any of the configurations of determination unit 170 and PUF cells $105_{x,y}$ disclosed above.

In S1710, one or more PUF cells $105_{x,y}$ are selected, for example by applying a selection potential to the selection mechanism of those one or more PUF cells $105_{x,y}$. In some instances, one PUF cell $105_{x,y}$ at a time may be selected and in other instances a plurality of PUF cells $105_{x,y}$ may be selected at the same time (for example, some or all of the PUF cells in a particular row of an array of PUF cells).

In S1720, for each selected PUF cell $105_{x,y}$, a transistor difference value is determined based at least in part on a comparison of an on-state characteristic of the matched pair of transistors $210_{x,y}$ in the selected PUF cell(s) $105_{x,y}$, wherein the transistor difference value is indicative of a random manufacturing difference between the matched pair of transistors $210_{x,y}$ in the selected PUF cell(s) $105_{x,y}$.

Optionally, if there is a further PUF cell(s) $105_{x,y}$ still to be selected and to have a transistor difference value determined, the method may return to S1710 to select that PUF cell(s) $105_{x,y}$ and then determine the corresponding transistor difference value. For example, this may be moving onto the next row in a PUF array after the transistor difference values have been determined for the preceding row. Once all of the PUF cells $105_{x,y}$ have been selected and their transistor difference values determined, the method may then proceed to S1730. Alternatively, for example where all PUF cells $105_{x,y}$ can be selected and their transistor difference values determined in a single iteration of S1710 and S1720, the method may always proceed directly from S1720 to S1730.

In S1730, the PUF output is determined based at least in part on the at least one determined transistor difference value, as explained earlier.

The skilled person will readily appreciate that various alterations or modifications may be made to the above described aspects of the disclosure without departing from the scope of the disclosure.

For example, whilst in all of the above disclosed aspects each PUF cell $105_{x,y}$ comprises only the matched pair of transistors $210_{x,y}$, which function as both the selection mechanism and the transistors to be compared to determine the transistor difference value, in an alternative implementation the PUF cells $105_{x,y}$ may comprise more than two transistors. For example, they may comprise the matched pair of transistors $210_{x,y}$ and also one or more transistors configured as a selection mechanism.

Figure 14:
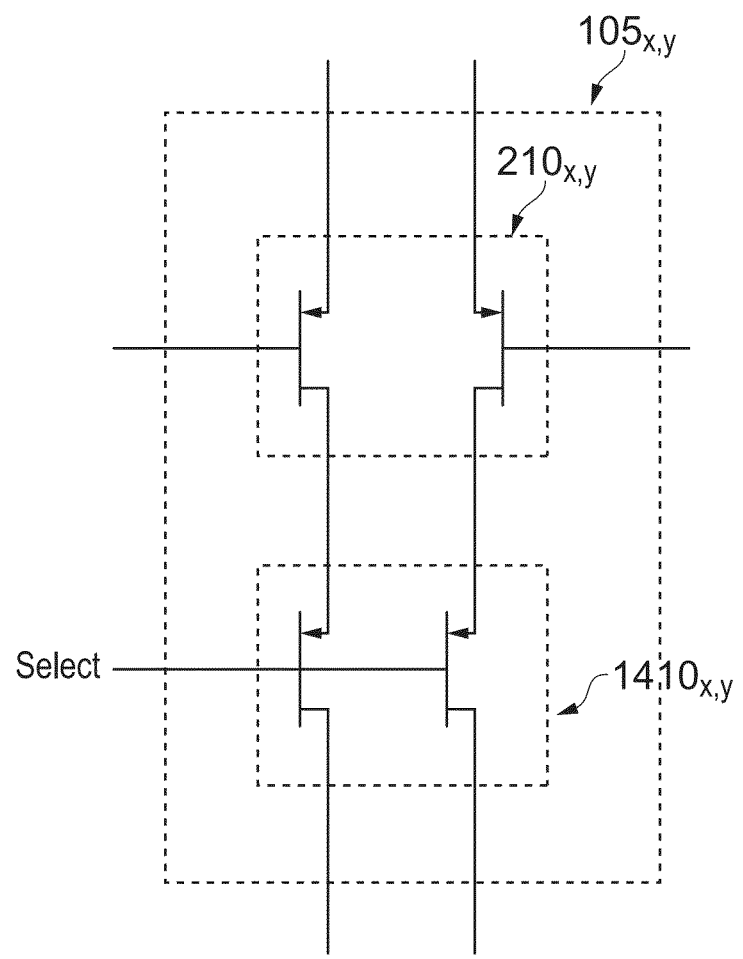
FIG. 14 shows an example schematic representation of a PUF cell comprising a pair of transistors and a separate selection mechanism.

FIG. 14 shows a schematic representation of an example PUF cell $105_{x,y}$ comprising selection transistors $1410_{x,y}$, which function as a selection mechanism. The selection transistors $1410_{x,y}$ in this example comprise two p-type FETs. The PUF cell $105_{x,y}$ may be selected by applying a selection potential to select the PUF cell $105_{x,y}$, wherein the selection potential is a potential sufficient to turn-on the selection transistors $1410_{x,y}$. Any PUF cells $105_{x,y}$ that are not to be selected at a particular time may have a non-selection potential applied to the selection transistors $1410_{x,y}$ such that the selection transistors $1410_{x,y}$ are turned off. Therefore, to determine a transistor difference value from a particular PUF cells $105_{x,y}$, a selection potential is applied to 'select' (for example, by the selector circuit 420) and, separately, first and second signals are applied to the matched pair of transistors $210_{x,y}$ (for example, by current sources and/or the selector circuit 420, or some other suitable circuit/unit). In an alternative, there may be only a single selection transistor per PUF cell $105_{x,y}$, for example coupled between the sources of the matched pair of transistors 210 and the current source 720 in the arrangement represented in FIG. 8. Furthermore, whilst the selection transistors $1410_{x,y}$ are represented in combination with the matched pair of transistors $210_{x,y}$ configured as a differential pair, it should be appreciated that selection transistors $1410_{x,y}$ may be used in combination with any configuration of the matched pair of transistors $210_{x,y}$ (for example, in combination with that of FIG. 2 or 4).

The selection transistors $1410_{x,y}$ are of the same transistor type as the matched pair of transistors $210_{x,y}$, such that plurality of transistors in a PUF cell $105_{x,y}$ are all of the same transistor type. This is not to mean that they are all of identical design, but that they are all n-type, or all p-type. By doing so, the plurality of transistors in the PUF cell $105_{x,y}$ may be more densely packed, thereby reducing the overall size of the PUF apparatus and also reducing the gradient issues described above.

The term 'coupled', used throughout this disclosure, encompasses both direct connections between components and indirect connections, wherein one or more intermediate component may be present in the coupling.

The array of PUF cells disclosed herein may be of any size and shape, for example with only one row and many columns, or vice-versa. Furthermore, whilst the present disclosure is generally in the context of an array of PUF cells, it will be appreciated that the plurality of PUF cells may be arranged in any suitable fashion and not necessarily as an array.

The invention claimed is:

1. A Physically Unclonable Function, PUF, apparatus comprising:
an array of individually selectable PUF cells, wherein each PUF cell of the array comprises a plurality of matched devices;
selection circuitry configured to select first and second PUF cells of the array of individually selectable PUF cells; and
determination circuitry configured to read out in parallel device difference values from
the plurality of matched devices of the first and second PUF cells of the array of individually selectable PUF cells.

2. The PUF apparatus of claim 1, wherein the array of individually selectable PUF cells comprises a row of PUF cells and a plurality of columns of PUF cells, and wherein the first and second PUF cells form part of the row of PUF cells.

3. The PUF apparatus of claim 2, further comprising a plurality of chop circuits, wherein a first chop circuit of the plurality of chop circuits is shared by PUF cells in a first column of the plurality of columns of PUF cells.

4. The PUF apparatus of claim 2, further comprising source circuitry configured to apply a common current source signal to PUF cells within a column of PUF cells of the array of individually selectable PUF cells.

5. The PUF apparatus of claim 2, wherein PUF cells in the row of PUF cells share an output from the selection circuitry.

6. The PUF apparatus of claim 2, further comprising a plurality of ADCs, wherein a first ADC of the plurality of ADCs is shared by PUF cells in a respective column of the plurality of columns of PUF cells.

7. The PUF apparatus of claim 6, wherein the plurality of ADCs share a ramp signal.

8. The PUF apparatus of claim 1, wherein the matched devices are matched transistors.

9. The PUF apparatus of claim 8, wherein the device difference values comprise transistor difference values, based on a comparison of an on-state characteristic of the matched transistors.

10. A Physically Unclonable Function, PUF, apparatus comprising:
rows and columns of PUF cells, wherein the PUF cells of a first row of the rows each comprises a plurality of matched devices;
selection circuitry configured to select the PUF cells of the first row; and
determination circuitry configured to read out in parallel device difference values from the PUF cells of the first row of PUF cells.

11. The PUF apparatus of claim 10, wherein the matched devices are matched transistors.

12. The PUF apparatus of claim 10, wherein the determination circuitry comprises a respective analog-to-digital converter (ADC) configured to process read out signals from PUF cells of the first row in parallel.

13. The PUF apparatus of claim 10, further comprising a plurality of chop circuits, wherein each chop circuit of the plurality of chop circuits is shared by PUF cells in a respective column of the columns of PUF cells.

14. The PUF apparatus of claim 10, further comprising a plurality of ADCs, wherein each ADC of the plurality of ADCs is shared by PUF cells in a column of the columns of PUF cells.

15. The PUF apparatus of claim 14, wherein the plurality of ADCs share at least one resource, comprising at least one of a ramp signal or a counter value.

16. The PUF apparatus of claim 10, wherein PUF cells in the first row of PUF cells share an output from the selection circuitry.

17. A Physically Unclonable Function, PUF, apparatus comprising:
a first PUF cell comprising a pair of matched transistors;
a second PUF cell comprising a pair of matched transistors;
first source circuitry configured to apply a first source signal to the pair of matched transistors of the first PUF cell;
second source circuitry configured to apply a second source signal to the pair of matched transistors of the second PUF cell; and
determination circuitry configured to read out transistor difference values from the first PUF cell and second PUF cell in parallel.

18. The PUF apparatus of claim 17, wherein the determination circuitry comprises first and second analog-to-digital converters (ADCs) configured to process read out signals from the first PUF cell and second PUF cell, respectively.

19. The PUF apparatus of claim 18, wherein the first and second ADCs share a ramp signal.

20. The PUF apparatus of claim 17, further comprising a plurality of chop circuits coupled to the first PUF cell and second PUF cell, respectively.

* * * * *